United States Patent [19]

Williams et al.

[11] Patent Number: 4,900,946
[45] Date of Patent: Feb. 13, 1990

[54] MULTI-FUNCTION SWITCH FOR AUTOMOTIVE VEHICLES

[75] Inventors: Edward L. Williams; Donald E. Riley, both of Ft. Wayne, Ind.

[73] Assignee: Navistar International Transportation Corp., Chicago, Ill.

[21] Appl. No.: 202,722

[22] Filed: Jun. 3, 1988

[51] Int. Cl.⁴ .......................... B60Q 1/26; H01H 3/16
[52] U.S. Cl. ................. 307/10.1; 200/61.27; 200/61.54; 307/10.8; 340/468
[58] Field of Search ............. 200/5 R, 5 A, 6 A, 12, 200/61.27–61.38, 61.54–61.57; 307/10 R, 10 LS; 340/74, 76, 81 R

[56] References Cited

U.S. PATENT DOCUMENTS

| | | | |
|---|---|---|---|
| 2,924,680 | 2/1960 | Swenson | 200/12 X |
| 3,373,312 | 3/1968 | Conn | 315/83 |
| 4,006,328 | 1/1977 | Kimberlin et al. | 200/61.54 |
| 4,058,797 | 11/1977 | Sekiguchi et al. | 340/56 |
| 4,087,663 | 5/1978 | Sawyer | 200/84 R |
| 4,128,770 | 12/1978 | Okazaki | 307/10 LS |
| 4,131,772 | 12/1978 | Weckenmann et al. | 200/61.54 |
| 4,139,749 | 2/1979 | Scherzer et al. | 200/61.54 |
| 4,180,713 | 12/1979 | Gonzales | 200/52 R |
| 4,213,116 | 7/1980 | Holtzman et al. | 340/73 |
| 4,219,706 | 8/1980 | Koch et al. | 200/4 |
| 4,293,743 | 10/1981 | Iwata et al. | 200/4 |
| 4,302,748 | 11/1981 | Gant | 340/67 |
| 4,306,218 | 12/1981 | Leconte et al. | 340/66 |
| 4,308,439 | 12/1981 | Itoh | 200/159 B |
| 4,315,117 | 2/1982 | Kokubu et al. | 200/61.27 |
| 4,328,431 | 5/1982 | Usami | 307/10 R |
| 4,333,071 | 6/1982 | Kira et al. | 340/56 |
| 4,352,401 | 10/1982 | Vitaloni | 180/90 |
| 4,357,507 | 11/1982 | LaBaune et al. | 200/61.27 |
| 4,358,751 | 11/1982 | Roudebush, Jr. | 340/73 |
| 4,379,954 | 4/1983 | Iwata et al. | 200/4 |
| 4,394,555 | 7/1983 | Long et al. | 200/159 R |
| 4,511,769 | 4/1985 | Sahakian et al. | 200/6 A |
| 4,518,836 | 5/1985 | Wooldridge | 200/61.54 |
| 4,543,456 | 9/1985 | Iwata et al. | 200/61.54 |
| 4,577,117 | 3/1986 | Takeda et al. | 307/10 R |
| 4,578,592 | 3/1986 | Nakazawa et al. | 307/10 R |
| 4,614,847 | 9/1986 | Sasao | 200/6 A |
| 4,616,224 | 10/1986 | Reighard | 307/10 R X |
| 4,628,310 | 12/1986 | Reighard et al. | 340/825.72 |
| 4,638,290 | 1/1987 | Wagner | 340/56 |
| 4,640,997 | 2/1987 | Lane, Jr. | 200/61.54 |
| 4,648,728 | 3/1987 | Erdelitsch et al. | 384/537 |

*Primary Examiner*—J. R. Scott
*Attorney, Agent, or Firm*—F. David Aubuchon; Dennis K. Sullivan

[57] ABSTRACT

A multi-function turn signal switch comprises a cylindrical switch body on which an operating lever is mounted for pivotal motion about a pivot located on the longitudinal axis of the body. Located internally of the body on a transverse end wall through which the lever passes, is a circular array of four sealed membrane switches, arranged at 90 degree intervals about the longitudinal axis. The lever is mounted in ball and socket type joint enabling the interior end of the lever to describe a frustoconical zone of swivelling. Internal mechanism, including an electromagnetic cancellation mechanism, within the body bears against the interior end of the lever to define various operating positions for the lever around the zone of swivelling, each correlated with actuation of a particular one of the membrane switches by means of a transverse circular disc that is on the lever between the lever mounting and the interior end of the lever. The lever is also displaceable longitudinally for simultaneous actuation of all the array's switches. Circumferential arrays of membrane switches are disposed on the outside of the switch body for selective actuation by rotary actuators. Compressible, resilient pads overlie all arrays to permit membrane switch actuation by the corresponding actuating device while absorbing a certain amount of the actuating device's travel.

55 Claims, 9 Drawing Sheets

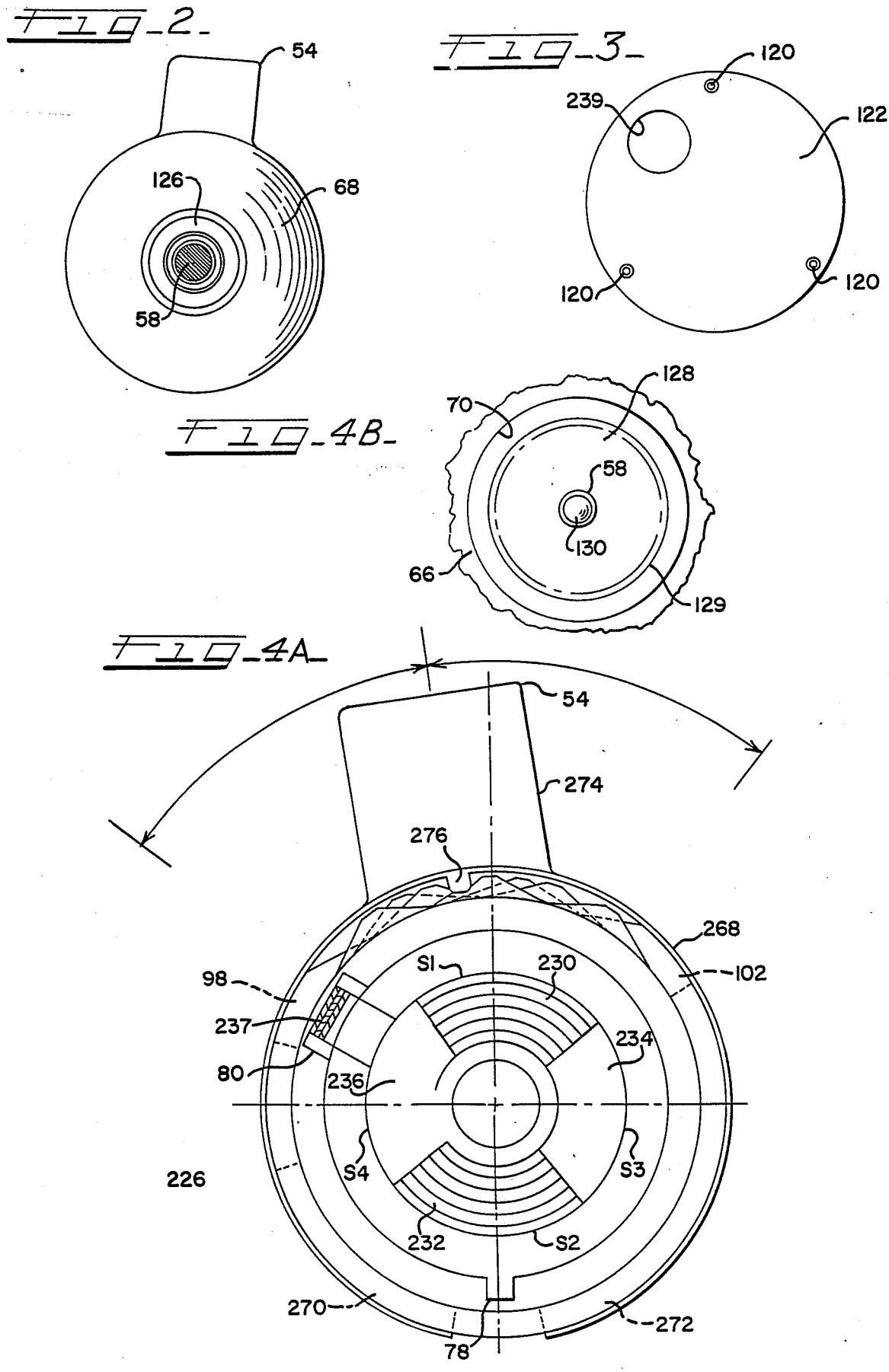

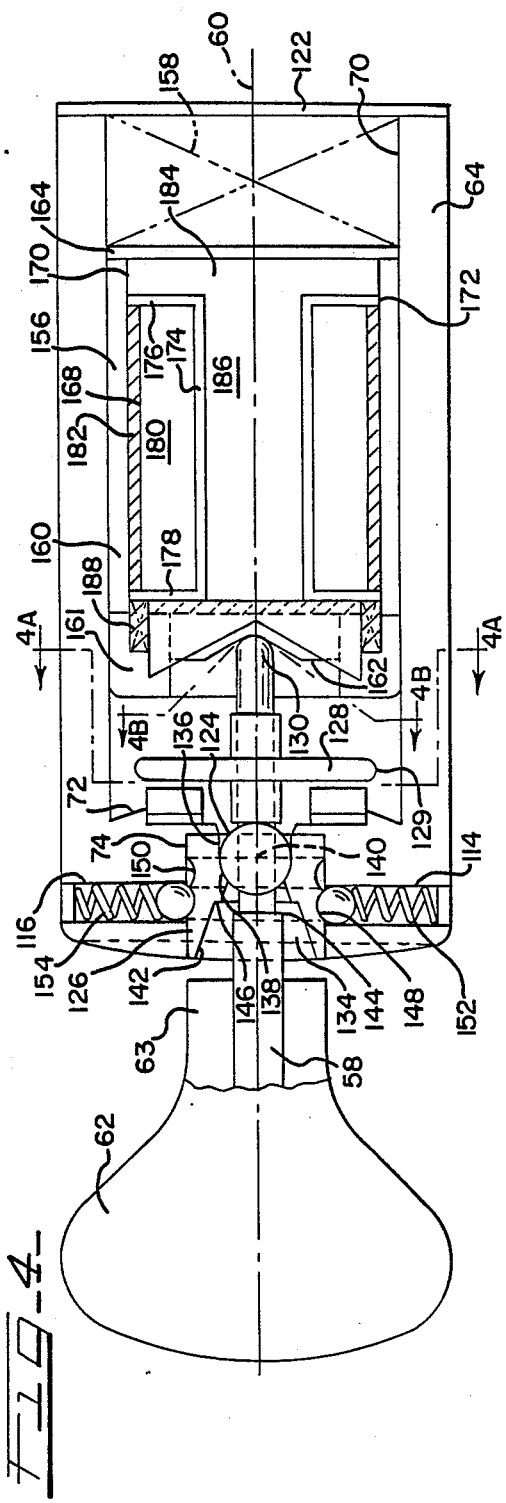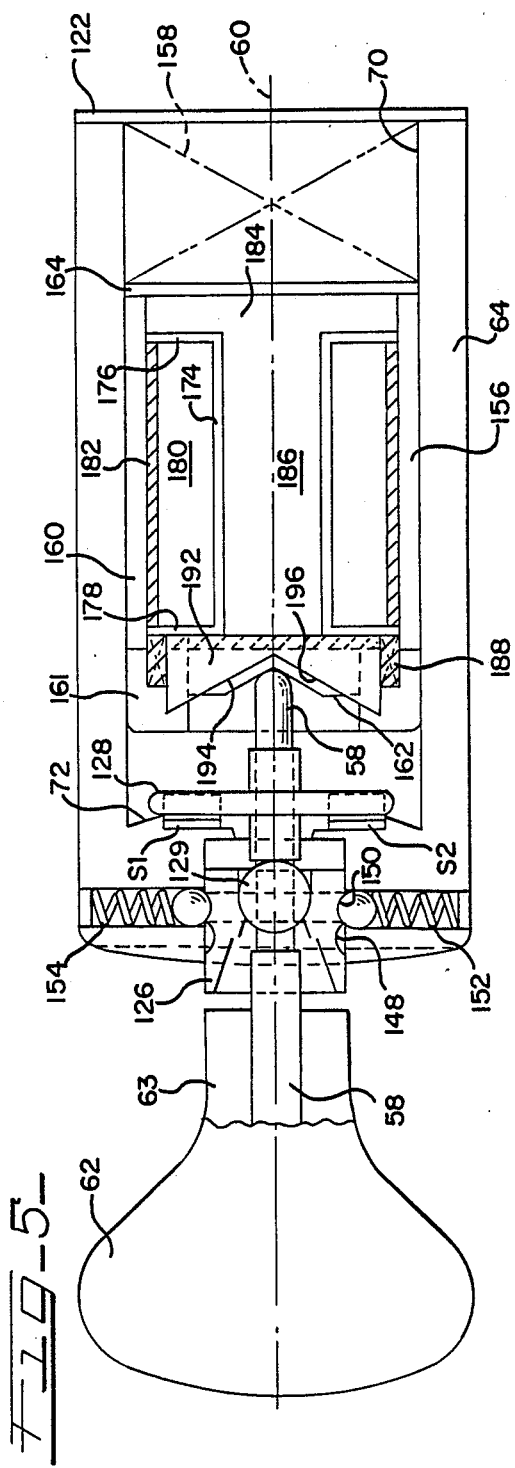

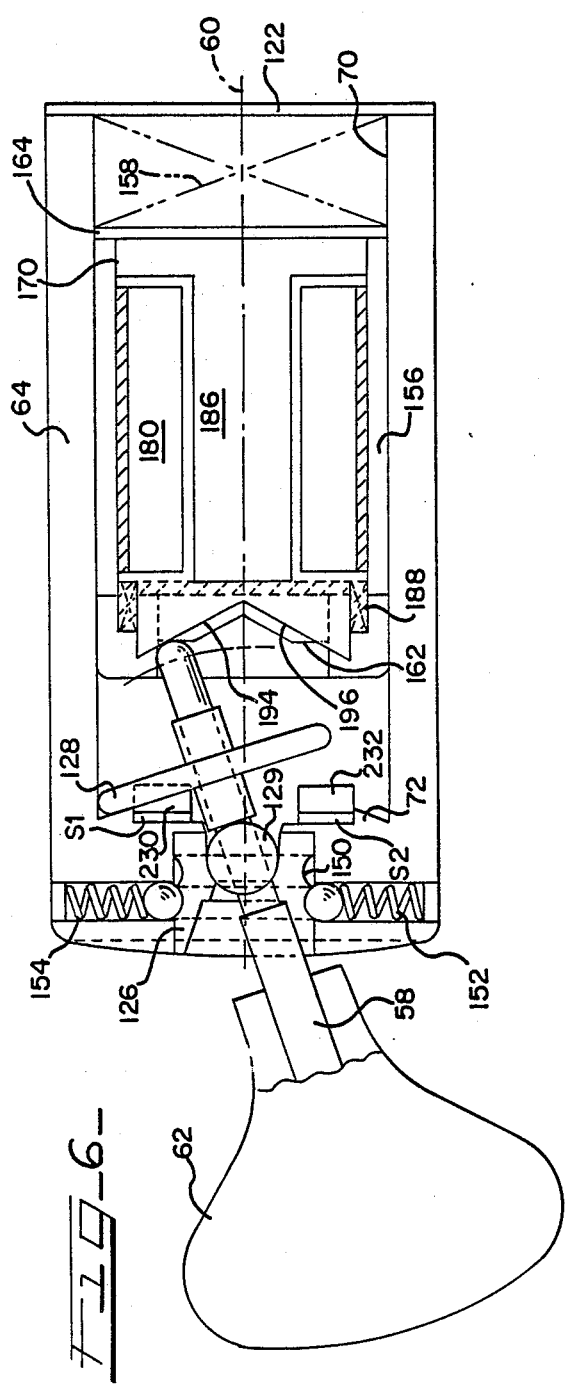

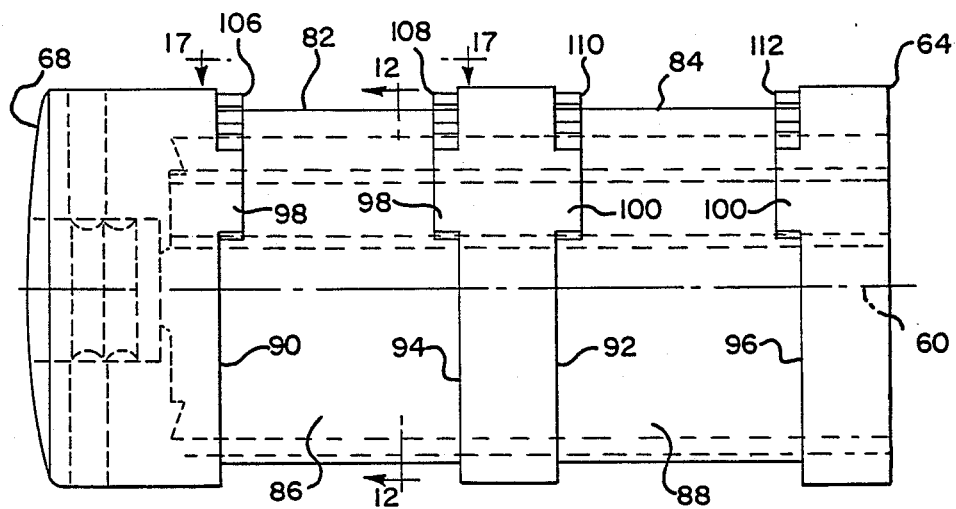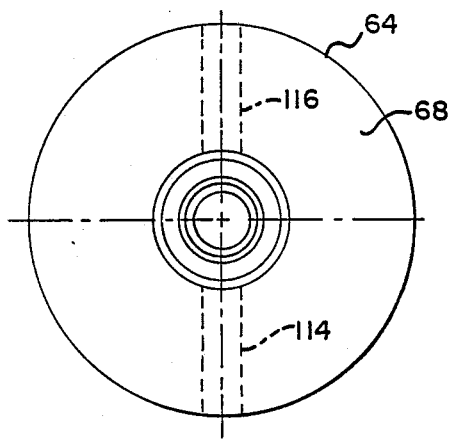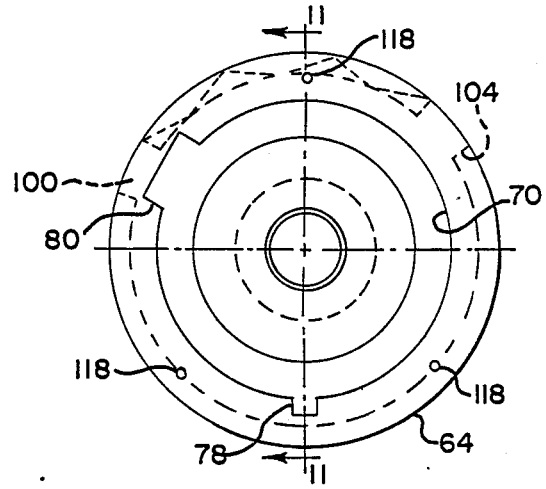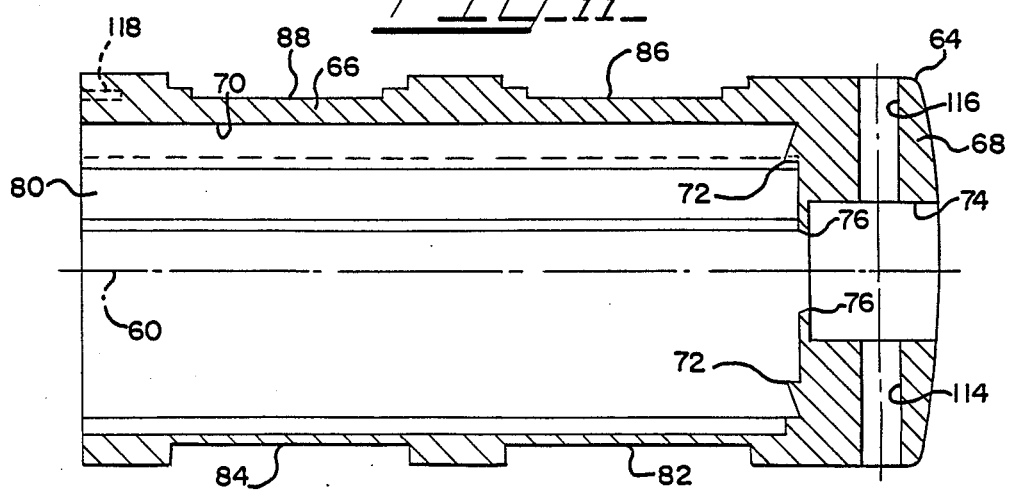

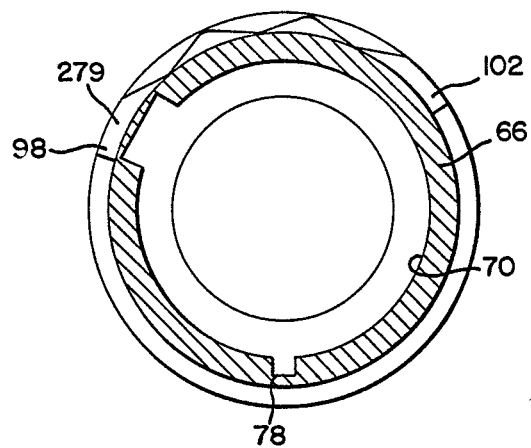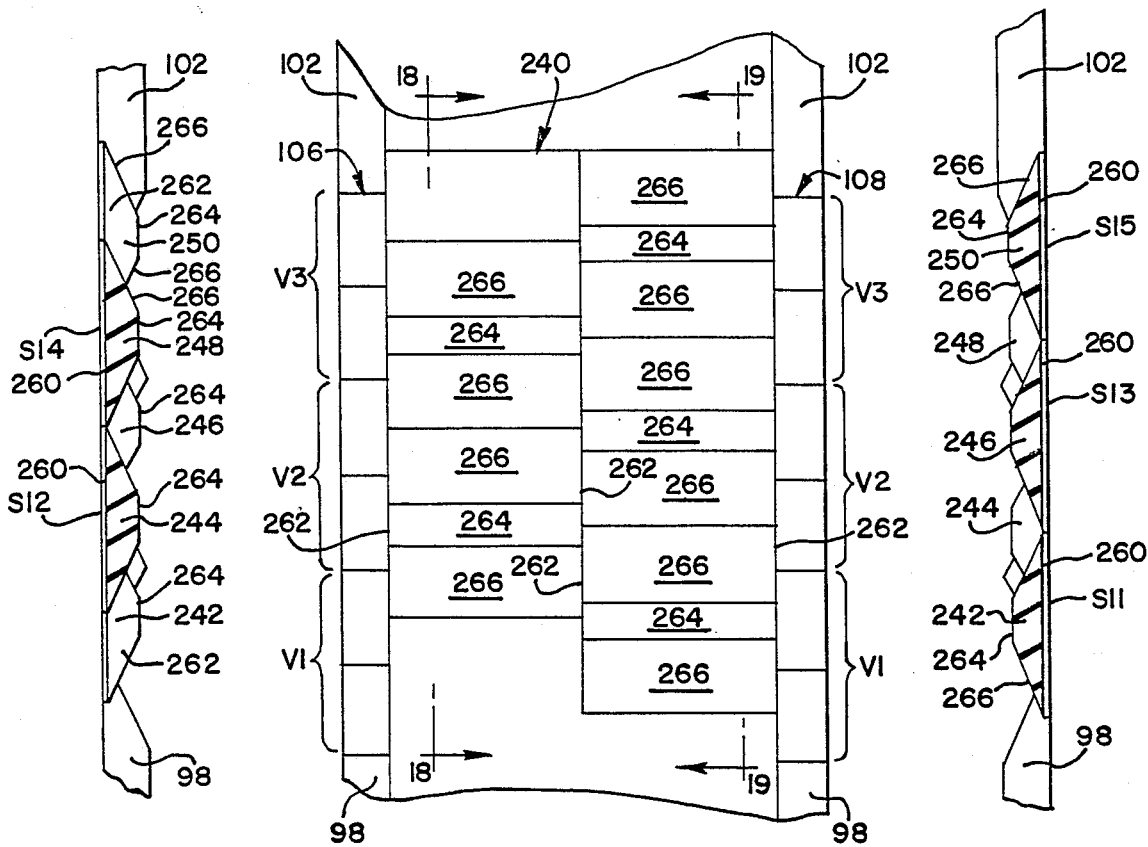

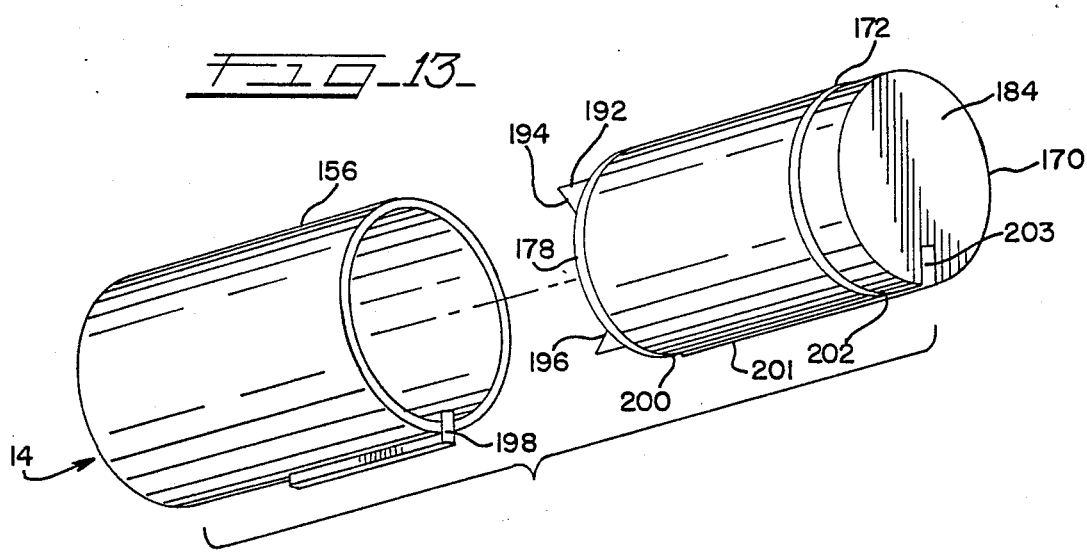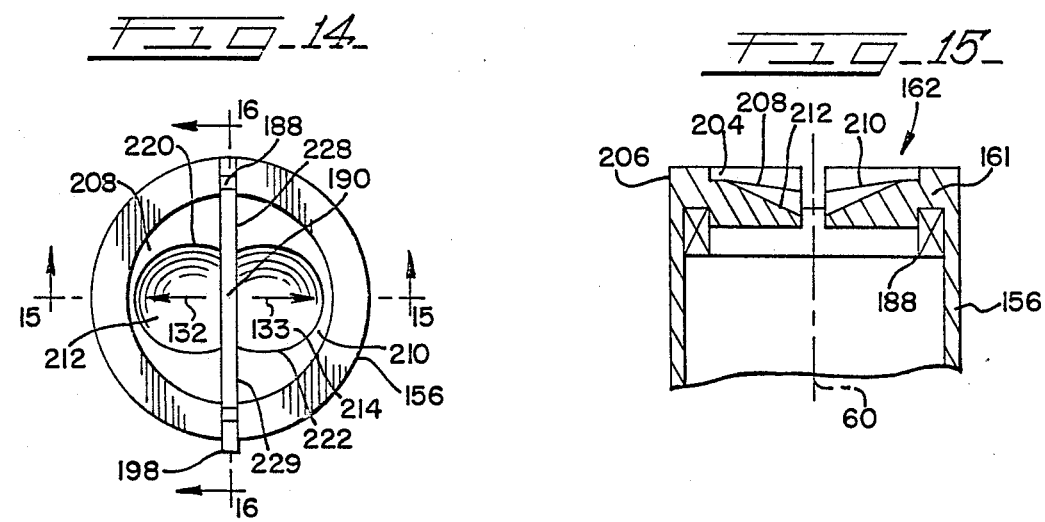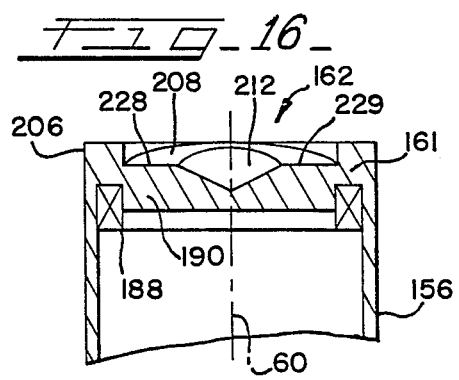

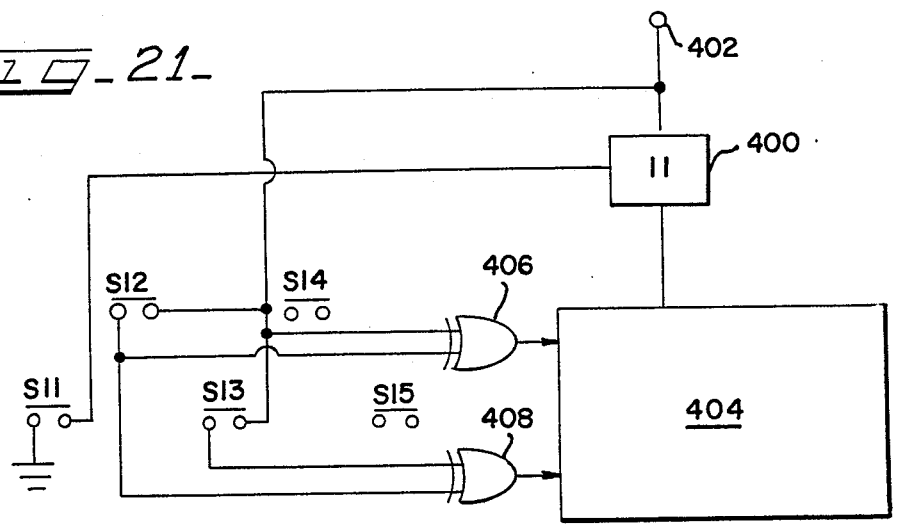
FIG-21-
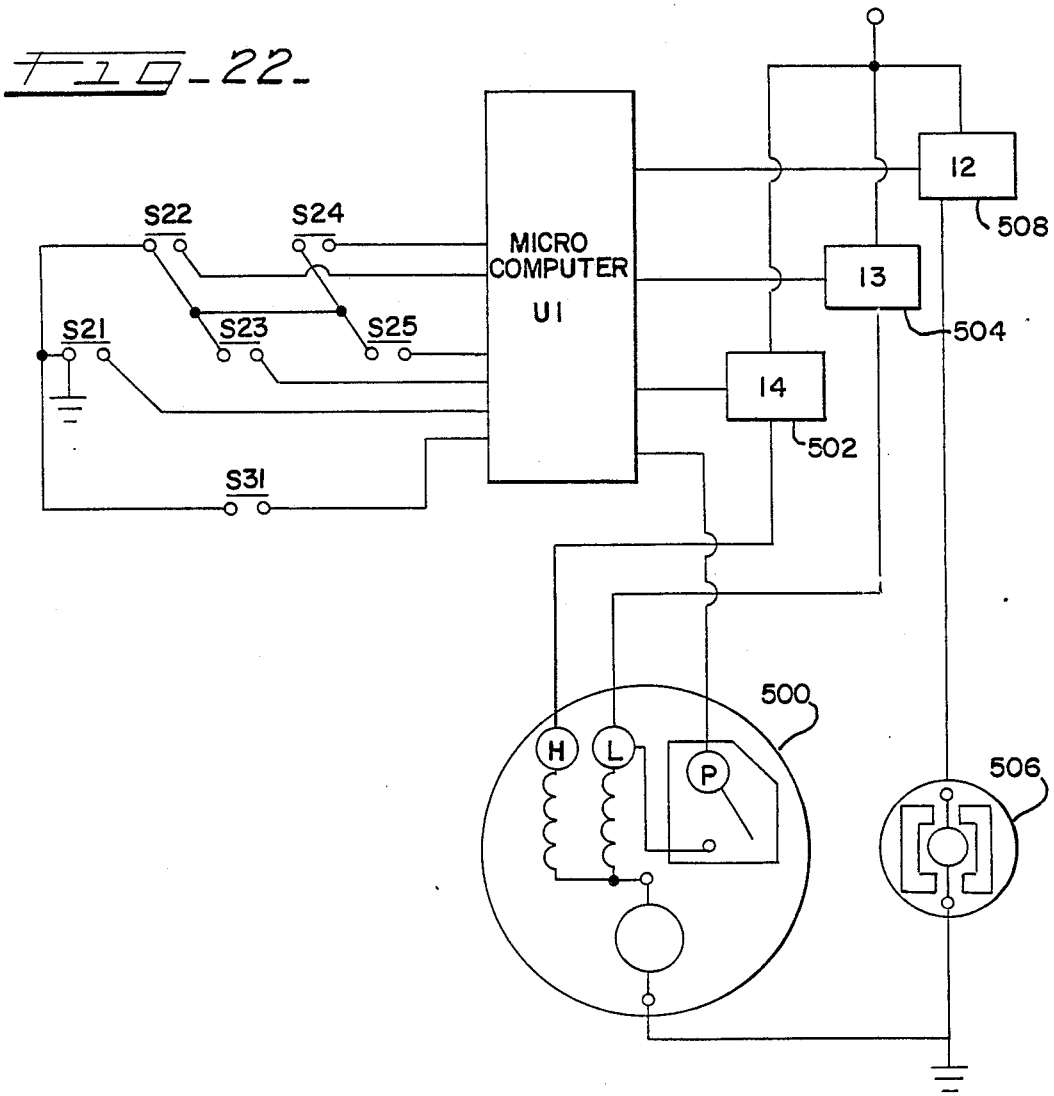
FIG-22-

MULTI-FUNCTION SWITCH FOR AUTOMOTIVE VEHICLES

BACKGROUND AND SUMMARY OF THE INVENTION

This invention relates to a multi-function switch of the type that is commonly mounted on the steering column of an automotive vehicle to perform various control functions that are in addition to the usual right and left turn signals given by the switch.

For various reasons it has become desirable to incorporate additional switch functions into what is commonly called the turn signal switch. For example, speed control, windshield washer and wiper control, and headlamp dimmer control are common examples of such additional functions. In embodying these additional functions into a turn signal switch, it is desirable that the basic turn signal operation that has become more or less standard through many years of usage be retained because of its widespread acceptance.

Virtually all turn signal switches comprise a body on which an actuating lever is pivotally mounted. The switch body is disposed on the steering column, either internally or externally, such that the lever projects away from the column generally to the left. When a turn is to be made, the lever is pivoted in the direction of turning to a position where it remains latched until after the turn has been completed at which time it is cancelled to return to its original position.

Typical turn signal switches embody cancellation mechanisms that automatically cancel the turn signal after a turn has been completed. However, steering motions to accomplish a turn do not necessarily always involve a consistent turning of the steering wheel in the direction of turning as the turn is being made. For example, a large highway tractor/trailer combination that must make a comparatively sharp turn (such as a right turn around a corner) is often initially steered somewhat in the opposite sense as the turn is approached (i.e., somewhat to the left) so that a large enough turning radius for the combination can be attained to allow the trailing end of the combination to clear the corner as the turn is being completed. Hence, automatic turn signal cancellation mechanisms that cancel upon the mechanical sensing of a small amount of motion opposite to the intended direction of turning are usually unsuitable for highway trucks because they could be prone to producing premature cancellation.

One aspect of the present invention relates to a new and improved organization and arrangement for a turn signal switch which renders the switch well suited for highway truck usage, particularly insofar as the automatic cancellation function is concerned. Specifically, this aspect of the invention relates to a novel cancellation mechanism in which the cancellation is performed by means of an electromagnetic cancellation mechanism that is operated from turning and speed information that is transmitted to a microcomputer by appropriate sensors. The microcomputer can process the turning and speed information in such a way that premature cancellation will be avoided for most types of turning. Similarly, the information to the microcomputer can be used to allow the turn signal to perform a lane change inication by detecting conditions indicative of the execution and completion of a lane change, and then cancelling. Furthermore, an inadvertent turn signal of which the vehicle operator may be unaware will be cancelled by detecting steering and driving conditions that are inconsistent with the execution of either a lane change or a turn, such as after the lever has been pivoted on for a certain amount of time while the vehicle is being driven in a generally straight line along a street or highway or after the vehicle has accelerated to a certain speed.

U S. Patents that are representative of known turn signal cancellation mechanisms are: U.S. Pat. Nos. 4,058,797; 4,128,770; 4,213,116; 4,302,748; 4,306,218; 4,333,071; 4,357,507; 4,358,751; 4,638,290; and 4,648,728. Headlamp switch cancellation mechanisms are shown in U.S. Pat. Nos. 3,373,312 and 4,577,117.

A further feature of the invention relates to the organization and arrangement of the turn signal lever on the switch body and more particularly to the manner in which the cancellation mechanism interacts with the lever to maintain the lever in turn signalling position during a turn until such time as the turn signal is to be cancelled upon completion of the turn. Of course a turn signal may be cancelled manually at any time simply by pivoting the lever back to its normal off position A unique organization and arrangement of the lever and cancellation mechanism endows the switch with the capability for the lever to give additional signals for other functions, either at the same time that it is giving a turn signal, or at any time when it is not giving a turn signal. In the disclosed embodiment of the invention, the turn signal lever is, in addition to being able to give right and left turn signal commands, also pivotable in opposite directions transverse to the directions of giving the right and left turn signals. The headlamp hi-beam/lo-beam selector switch (commonly known as a dimmer switch) is operated when the lever is pivoted in the first of these other directions and the marker lamps are interrupted to provide a marker interrupt signal when the lever is pivoted in the second of these other directions. Hence, headlamp dimmer control and marker interrupt signalling are the two additional functions that can be performed by the lever, not only when the turn signals are off, but also even when a turn signal is being given.

Furthermore, the lever can also be displaced longitudinally of the switch body to perform additional switching functions. When the lever is pulled outwardly, the hazard warning function is given. After the lever has been pushed inwardly to terminate the hazard warning function, a still further inward pushing will be effective to operate the windshield washer pump motor to cause washer fluid to be dispensed onto the vehicle's windshield.

One of the constructional features of the switch is a ball and socket type joint that is used to pivotally mount the lever on the switch body. Such a construction can be economically fabricated, and it occupies a comparatively small amount of space, especially when compared to prior multi-function turn signal switches that often employ plural gimballed joints, or the like, in order to attain four directions of pivotal motion for their levers. The socket is formed in a seat member which is itself displacable in two directions axially of the switch body, the first outwardly, when the lever is pulled outwardly. to give the hazard warning signal, and the second inwardly, when the lever is pushed inwardly, to terminate the hazard warning signal. When the lever is pushed still further inwardly to operate the windshield washer pump motor, the ball, which is on the lever, can unseat a limited amount from the socket, returning to seat in the socket after the pushing force on the lever has ceased.

An additional constructional feature is the surface configuration of an axial end face of a piston that houses the cancellation mechanism and that interacts with the lever during its pivoting to give the various signals heretofore mentioned. This face comprises a complex surface configuration and through resilient biasing of the piston is caused to bear against the tip of the lever to maintain the ball forcefully seated in the socket. The piston face has different surface contours that enable the lever to be retained in a turn signalling position until cancelled, yet also enabling the headlamp dimmer and marker lamp interrupt functions to be performed regardless of whether or not a turn signal is being given. When a turn signal is to be automatically cancelled, the electromagnet of the cancellation mechanism is energized to cause a plunger-operated ramp to protrude through a slot in the piston face that bears against the lever tip, to unseat the lever tip from the piston face, and to cam the lever from its pivoted position back to the off position where it is collinear with the switch axis body.

Still another constructional feature of the switch is the disposition of a circular array of individual electrical switches on the interior face of the outer axial end wall of the switch body for selective actuation by a circular disc that is disposed transversely of the lever between the interior axial end of the lever and the ball and socket joint. Positioning of the lever in the manner described above produces a corresponding positioning of the disc, whose peripheral edge activates the appropriate switch or switches of the array, depending upon exactly how the lever is operated.

Examples of prior turn signal switches that illustrate different constructions for the lever mounting, including the gimbal type mounting referred to above, are: U.S. Pat. Nos. 4,006,328; 4,139,749; 4,219,706; 4,293,743; 4,315,117; 4,328,431; 4,352,401; 4,357,507; 4,379,954; 4,543,456; 4,616,224; 4,628,310; and 4,640,997;

Still further switching functions are incorporated into the multi-function switch of the present invention. Additional switch functions are performed by arrays of switches that are disposed on the outside of the switch body and cooperatively associated with rotary actuator elements that are adapted for arcuate motion in the circumferential sense about the axis of the switch body. Although the switch elements of each of these arrays are disposed on the exerior of the switch body, they are covered by the corresponding actuator.

A series of circumferentially extending detents are provided for each rotary actuator whereby discrete settings of each actuator produce unique switch actuation patterns for the switches of the corresponding array. Moreover, limited movement of an actuator to either side of a discrete detent setting is effective to change the status of switches of the array so that further different unique switch signalling patterns are presented to each side of a discrete detent setting. The unique patterns of actuation of the switches in the arrays can be advantageously used for controlling cruise control and windshield wiper motor control functions, the specific examples disclosed herein.

For instance, when an actuator that is used to control the windshield wiper motor is placed at the discrete detent setting corresponding to an intermittent wipe mode of operation, the motor will operate in the intermittent mode. If it is desired to increase the wipe delay, the switch is rocked to one side of the detent setting, and the change in status of the switch pattern of the array is detected by the microcomputer which makes an adjustment in the amount of the delay depending upon the time for which the actuator is held rocked away from the detent position. Similarly, a decrease in delay is accomplished by rocking in the opposite direction.

The invention is advantageously configured for the use of membrane type switches for the arrays that are associated not just with the rotary actuators, but with the lever too. The membrane switches are quite thin and can be mounted on surfaces of the switch body without occupying a large volume of space. While it would be possible to press directly on such a membrane switch and operate it, the thinness of the membrane switches with their extremely limited amount of switch travel might seem too precise for mass production fabrication and assembly operations of the tolerances typically used for automotive-type switches.

The multi-function switch of this invention admirably addresses this concern by utilizing resiliently compressible actuator pads disposed in association with the membrane switches such that each switch is actuated through a corresponding pad. Each pad is effective to operate the corresponding membrane switch in response to pressure applied to the pad while absorbing a certain amount of the actuator travel whereby close tolerancing of the actuators to the membrane switches is avoided. This makes the switch assembly well suited for automotive mass production procedures using tolerances typically associated with mechanical switches of this general type.

These compressible, resilient pads have one particular configuration for the array of switches that perform the turn signal, headlamp dimmer, marker interrupt, and hazard warning functions, and a different configuration for the arrays of switches that are used with the rotary actuators. Both will be described in detail later on in the specification.

Examples of very thin, or membrane type switches are shown in U.S. Pat. Nos. 4,087,663; 4,131,772; 4,308,439; 4,394,555; and 4,518,836. Other examples of switches associated with automotive vehicle steering columns are found in: U.S. Pat. Nos. 4,180,713 and 4,578,592.

Other parts of the switch are also well suited for economical fabrication and the use of automated assembly procedures. The switch comprises a metal body that can be fabricated using conventional machining procedures. The cancellation mechanism also comprises metal parts that can be conventionally machined.

To then briefly summarize, a switch embodying principles of the present invention is capable of providing a number of switching functions in a comparatively compact volume and in a manner which is conducive to economical mass production fabrication and assembly. The switch carries very low currents through the membrane switches and is especially well-suited for use with a microcomputer that is responsive to the membrane switch conditions for in turn controlling power circuits to the various lamps and other electrical load devices on the vehicle that are under the control of the multi-function switch. It also possesses new and unique functional features which are beneficial for the operator of the vehicle.

The foregoing features, advantages and benefits of the invention, along with additional ones, will be seen in the ensuing description and claims which should be considered in conjunction with the accompanying drawings. The drawings disclose a presently preferred embodiment according to the best mode contemplated at the present time in carrying out the invention.

BRIEF DESCRIPTION OF THE DRAWINGS

FIG. 2 is a transverse cross sectional view taken in the direction of arrows 2—2 in FIG. 1.

FIG. 3 is a transverse cross sectional view taken in the direction of arrows 3—3 in FIG. 1.

FIG. 4 is a longitudinal cross sectional view through the switch of FIG. 1 by itself illustrating the normal off position assumed by the component parts of the switch when it is not commanding any of its possible functions for the several electrical circuits that are under its control.

FIG. 4A is an enlarged fragmentary transverse cross sectional view taken in the direction of arrows 4A—4A in FIG. 4.

FIG. 4B is a fragmentary transverse cross sectional view taken in the direction of arrows 4B—4B in FIG. 4.

FIG. 5 is a view similar to FIG. 4 illustrating the switch having been operated to a condition commanding actuation of hazard warning lamps.

FIG. 6 is a view similar to FIG. 4 illustrating the switch having been operated to a condition commanding left turn signal lamps actuation.

FIG. 7 is a view similar to FIG. 6 illustrating the incipient cancellation of the left turn signal command.

FIG. 8 is a longitudinal view of the main body of the switch of FIG. 1 shown by itself.

FIG. 9 is a left end view of FIG. 8.

FIG. 10 is a right end view of FIG. 8.

FIG. 11 is a longitudinal cross sectional view through the switch body taken in the direction of arrows 11—11 in FIG. 10.

FIG. 12 is a transverse cross sectional view taken in the direction of arrows 12—12 in FIG. 8.

FIG. 13 is an exploded perspective view of several of the component parts of the switch shown by themselves.

FIG. 14 is a view looking generally in the direction of arrow 14 in FIG. 13.

FIG. 15 is a cross sectional view taken in the direction of arrows 15—15 in FIG. 14.

FIG. 16 is a cross sectional view taken in the direction of arrows 16—16 in FIG. 14.

FIG. 17 is a developed view taken generally in the direction of arrows 17—17 in FIG. 8 but showing additional parts of the switch.

FIG. 18 is a cross sectional view taken in the direction of arrows 18—18 in FIG. 17.

FIG. 19 is a cross sectional view taken in the direction of arrows 19—19 in FIG. 17.

FIG. 21 is an electrical schematic diagram of another of the electrical circuits under the control of the switch.

FIG. 22 is an electrical schematic diagram of still another of the electrical circuits under the control of the switch.

DESCRIPTION OF THE PREFERRED EMBODIMENT

Figure 1:
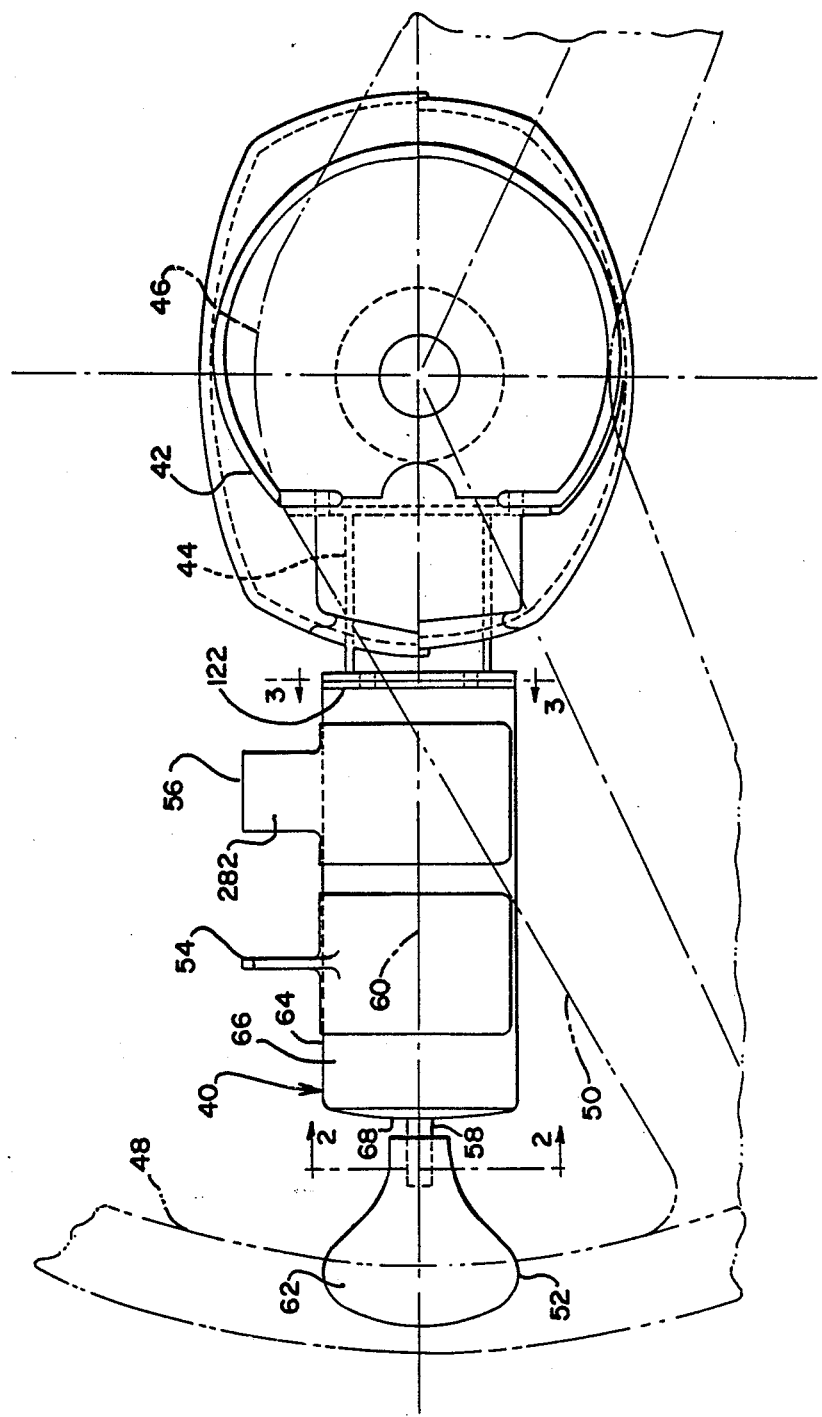
FIG. 1 is a longitudinal view of a multi-function switch embodying principles of the present invention disposed in association with a steering column and a steering wheel of an automotive heavy truck.

FIG. 1 shows a multi-function switch assembly 40 embodying principles of the present invention mounted on a steering column 42 of an automotive heavy truck. The mounting of switch assembly 40 on column 42 is via an adapter 44 which serves to conform switch assembly 40 to a particular design of steering column 42 whereby a common design for switch assembly 40 may be used with various steering column designs through use of particular adapters 44. The steering column contains a shaft that is attached to the hub of a steering wheel 46, and FIG. 1 portrays the representative relationship of switch assembly 40 to the rim 48 of the steering wheel (in phantom) and also to an arm, or spoke, 50 of the steering wheel (also in phantom) for a steering condition that is representative of the vehicle being steered in an approximately straight line. Switch assembly 40 is disposed spaced behind, and slightly above, arm 50 where it may be conveniently actuated, typically by the left hand of the vehicle operator, to perform various functions in various manners hereinafter to be described.

By way of introduction, switch assembly 40 comprises three switch actuators 52, 54, 56, each of which may be independently actuated by the vehicle operator. Actuator 52 is a lever which comprises a shaft 58 that is coaxial with the main longitudinal axis 60 of switch assembly 40. A knob 62 is disposed on the free axial end of shaft 58 directly behind rim 48. Actuators 54 and 56 are arranged for limited motion in the circumferential sense about axis 60.

Switch assembly 40 further comprises a main body, or housing, 64 that is generally of an elongate circular cylindical shape Details of body 64 by itself are shown in FIGS. 8–12 and reference is now also made to those FIGS.

Body 64 comprises a sidewall 66 and a left end wall 68, the body's right end that is toward steering column 42 being open. Sidewall 66 bounds a circular walled bore 70 that is coaxial with axis 60 and extends from the open right hand end of body 64 to left end wall 68. A triangular shaped annular shoulder 72 is fashioned at the junction of bore 70 and end wall 68 A circular bore 74 of smaller diameter than bore 70 extends through end wall 68 coaxial with axis 60. An annular shoulder 76 is fashioned at the junction of bore 74 and bore 70, and the two bores 74 and 70 are in communication with each other through the circular region that is circumscribed by shoulder 76.

Two keyways 78 and 80 are provided in bore 70. Both are of generally rectangular cross sectional shape with keyway 78 being the smaller of the two. As viewed in FIG. 10, keyway 78 is at the 6:00 o'clock position while keyway 80 is approximately at the 10:00 o'clock position. As will become more apparent from the ensuing description, keyway 78 serves to provide circumferential alignment for internal component parts of assembly 40 while keyway 80 provides a free space through which electrical wiring can pass axially through body 64 to certain internal electrical components within body 64. The two keyways are essentially coextensive in length with bore 70, both being open at the right hand end and ending substantially at the inner face of end wall 68.

The exterior surface of body 64 comprises a pair of axially spaced apart, circumferentially extending channels 82, 84. Actuators 54 and 56 are respectively cooperatively arranged in the respective channels 82, 84 for circumferential motion, each along an arc of approximately 90 degrees, which as viewed in FIG. 4A, extends approximately 45 degrees to either side of the center of each actuator as measured circumferentially around the actuator. Each channel 82, 84 comprises a corresponding bottom wall 86, 88, a corresponding sidewall 90, 92 at one side of its bottom wall 86, 88, and a corresponding sidewall 94, 96 at the other side of its bottom wall 86, 88. The approximate 90 degree arcuate range of travel of each actuator 54, 56 is limited in each direction by a corresponding pair of stops which project inwardly of the corresponding channel's sidewalls. In the case of channel 82, a pair of stops 98 limit the clockwise motion of actuator 54 as viewed in FIG. 4A while a pair of stops 100 do the same for actuator 56 in channel 84 (see FIG. 10). The counterclockwise travel as viewed in the same direction is limited by stops 102 for actuator 54 and stops 104 for actuator 56 (refer also to FIG. 17). Exactly how these stops interact with the actuators will become more apparent later on when the actuator details are described.

Spanning the arcuate range of travel of actuators 54, 56 between counterclockwise and clockwise limits are series of detents, 106, 108 for channel 82, and 110, 112 for channel 84. In cooperation with the respective actuators 54, 56, these series of detents serve to define discrete settings for the actuators within their respective spans of arcuate travel. Electrical switch arrays, to be hereinafter described in detail, are disposed against the bottom wall 86, 88 of each channel in the region bounded axially of body 64 by the respective series of detents and arcuately by the respective stops. Various modes of operation of each switch array are established by particular positions of the corresponding actuator along its arcuate path of travel.

Body 64 still further comprises a pair of coaxial circular holes 114, 116 each arranged to pass radially of axis 60 completely through end wall 68 between the exterior of body 64 and bore 74. As will be explained later, these holes 114, 116 accommodate detent mechanisms that are associated with another part of assembly 40.

The axial end face of body 64 that is toward knob 52 has a slightly domed shape for appearance. The opposite axial end of body 64 is perpendicular to axis 60. A series of tapped holes 118 (FIG. 10) are provided in this latter end to receive the shanks of headed screws 120 (FIG. 3) that are used to removably attach a circular cover, or disc, 122 that encloses this end.

Details of the internal construction of switch assembly 40 can be seen with reference to FIG. 4 which shows the switch in off position. Lever shaft 58 comprises a sphere 124 that is disposed such that the center 140 of the sphere lies on axis 60. Sphere 124 cooperates with an annular seat element 126 to form a pivot for lever shaft 58.

A circular disc 128 is also disposed on shaft 58 more interiorly of sphere 124. Disc 128 is rigidly secured to shaft 58 and is perpendicular to the shaft axis. The outer perimeter of disc 128 is radiused at 129 while the axially interior end of shaft 58 comprises a hemispherical nose 130.

In FIG. 4 element 126 is shown disposed coaxial with and fully within bore 74. Element 126 itself has a throughbore 134 that is coaxial with axis 60. At its interior axial end, throughbore 134 has a straight section 136 of a diameter just slightly greater than that of sphere 124, allowing both the left end of shaft 58 (less knob 62) to pass through and also sphere 124 to be received into the throughbore via the axially inner end of element 126. This straight section 136 of throughbore 134 blends into an annular seat 138 that has a radius just slightly greater than that of sphere 124. This seat serves two purposes: one, to form a stop that limits the extent to which lever shaft 58 can pass axially outwardly relative to element 126; and two, to provide for the swivel mounting of the lever about the sphere's center 140 when the sphere is seated fully in the seat. Hence, the sphere and seat may be considered a form of ball and socket type joint for swivel mounting of the lever.

Throughbore 134 still further comprises a frusto-conically tapered portion 142 that is of progressively increasing diameter in the axially outward direction. This frusto-conically tapered portion 142 serves to define the limit of a conical zone of swiveling for lever 58 about center 140. Since the lever has a shoulder 144 that lies within throughbore 134 just slightly axially outwardly beyond sphere 124, frusto-conically tapered portion 142 is provided with a corresponding shoulder 146 to accommodate both the smaller diameter and the larger diameter portions of the lever on either side of shoulder 144.

The length of element 126 is essentially equal to that of bore 74 so that element 126 can assume a position where it is fully disposed within bore 74, as portrayed by FIG. 4. An axially central region of element 126 comprises a pair of circumferentially extending grooves 148, 150 that are arranged immediately axially adjacent each other. A cross section that is transverse to the circumferential sense of each groove 148, 150 reveals each to have a spherical contour of roughly 90 degrees arcuate extent.

Spring-loaded detent mechanisms 152, 154 are disposed in the respective holes 114, 116, and when element 126 is fully disposed within bore 74 as in FIG. 4, the two detent mechanisms engage groove 148. Since element 126 is in abutment with shoulder 76 for this position, an axially inward force applied to lever 58 along axis 60 will be oapable of unseating sphere 124 from seat 138 thereby allowing the lever to be bodily displaced more internally of body 64 than the position shown by FIG. 4. The use of this facility will be explained later.

On the other hand, with lever 58 in the position shown in FIG. 4, the application of an axially outward force to the lever along axis 60 will result in overriding of the detent mechanisms such that the lever will bodily move element 126 more exteriorly of the switch body until the detent mechanisms seat in groove 150. This position is shown in FIG. 5 where it can be seen that both element 126 and lever 58 have been displaced to the left from the FIG. 4 position by an amount equal to the axial distance between the centers of the two grooves 148, 150. Any attempt to move lever 58 and element 126 more exteriorly from the FIG. 5 position will be prevented by abutment of disc 128 with shoulder 72.

Sphere 124 is biased into seating on seat 138 by other internal components of assembly 40 which include a piston 156, and a helical coil spring 158.

Overall, piston 156 has a generally circular cylindrical shape arranged for sliding travel within bore 70 coaxial with axis 60. Piston 156 comprises a sidewall 160 and an end wall 161 having an outer end face 162 that confronts lever shaft 58. Specifically, end face 162 has a complex shape that is configured for coaction with lever 58 in performance of certain of the various functions of switch assembly 40. Details of this complex surface configuration will subsequently be described with reference to FIGS. 13-16. A circular disc 164 whose diameter is essentially the same as that of sidewall 160 is disposed against the otherwise open axial end of piston 156 that lies axially opposite end wall 161.

Spring 158 is disposed between disc 164 and the axially inner face of cover 122 that is attached to the end of body 64 in the manner previously described. In the position shown in FIG. 4, spring 158 is resiliently compressed a predetermined amount such that, bearing against cover 122, it exerts a force that is transmitted through disc 164 and sidewall 160 of piston 156 to end wall 161 where in turn the force is exerted on the rounded end 130 of lever 58 causing sphere 124 to be forcefully seated in seat 138. The spring force is sufficient to maintain the several parts in mutual engagement, but it is not so large that it unduly restricts the ability of the lever to unseat sphere 124 from seat 138 nor that it unduly restricts the ability of the lever to swivel about center 140 while seated.

A cancellation mechanism that comprises an electromagnet 168 and a metal plunger 170 is disposed within piston 156. Electromagnet 168 comprises a non-metallic spool, or bobbin, 172 that has a main cylindrical wall 174 concentric with axis 60. The spool has annular end walls 176, 178 that are directed radially outwardly from main wall 174 at its opposite axial ends. These end walls have circular shapes enabling the electromagnet to fit with a close axial sliding fit within sidewall 160 of piston 156.

Electromagnet 168 comprises wire wound on bobbin 172 to form a coil 180 that is contained by a cylindrical sleeve 182 that forms part of the magnetic flux path but does not protrude radially beyond the perimeters of the bobbin end walls 176, 178.

Plunger 170 has a circular head 184 and a circular shaft 186 allowing the plunger to be fitted coaxially to the electromagnet 168 with the plunger shaft fitting closely within the bore of bobbin 172 that is bounded by wall 174 and with the plunger head abutting end wall 176. Piston 156 and plunger 170 are in turn covered by disc 164 after the electromagnet and plunger have been disposed within piston 156 to form a unit in the manner shown.

A resiliently compressible annular element 188 is disposed axially between end wall 178 and the inside of end wall 161 for the purpose of biasing the electromagnet/plunger unit within piston 156 to the position shown in FIG. 4 where the electromagnet/plunger unit is in abutment with disc 164. As will become more apparent from ensuing description, energization of the electromagnet will cause the electromagnet/plunger unit to be displaced within piston 156 to the left from the position shown in FIG. 4, compressing element 188 in the process. Correspondingly, de-energization of the electromagnet will enable element 188 to return the electromagnet/plunger unit to the position illustrated in FIG. 4.

In order to understand the interaction of the piston and the electromagnet/plunger unit with lever 58, consideration must now be given to the details of the face 162 of end wall 161 of piston 156, as further portrayed in FIGS. 13-16. End wall 161 has a diametrical slot 190 which is sufficiently deep axially of the piston to overlap somewhat more than half of element 188. Bobbin 172 comprises a diametrical wall 192 that protrudes perpendicularly from its end wall 178 on the side thereof opposite cylindrical wall 174. The width of wall 192 is just slightly less than that of slot 190 allowing the wall to fit within the slot. The purpose of wall 192 is to provide a pair of ramp surfaces 194, 196 respectively that lie on an imaginary frusto-conical surface whose apex lies on axis 60. As will be seen from later description, these ramp surfaces 194, 196 are used to cause the return of the lever from right and left turn signal positions when the turn signals are to be cancelled by the energization of electromagnet 168. It is to be observed that the diametrical dimension across wall 192 is slightly less than the I.D. of element 188 so that wall 192 thereby passes through element 188 unimpeded.

Although the bobbin and piston are in circumferential registry once wall 192 enters slot 190, circumferential registry at the initial assembly of the electromagnet/plunger unit to the piston is achieved by providing a longitudinal key 198 on sidewall 160 at the open right hand end thereof. Aligned notches 200, 201, 202, and 203 are provided in the bobbin's end walls, sleeve 182, and plunger head 184 to form a keyway in circumferential alignment with wall 192. They serve the purpose of aligning the electromagnet/plunger unit so that wall 192 is aligned for entrance into slot 190 as the electromagnet/plunger unit is being slid into the piston. Key 198 also aligns piston 156 with keyway 78 when the piston is slid into body 64.

The outer face 162 of end wall 161 comprises a counterbore 204. The counterbore has a circular cylindrical surface extending axially straight approximately as deep as the location indicated by the reference numeral 206 where the complexity in face 162 begins.

On each side of slot 190 there is a somewhat crescent-shaped, or C-shaped, surface 208, 210, respectively, that bounds a corresponding concave, somewhat semi-elliptically shaped surface 212, 214, respectively. Looking endwise of slot 190, i.e. transverse to axis 60 as in FIG. 15, the two generally crescent shaped surfaces 208, 210 are each flat, lying on imaginary flat planes that are at identical acute angles to axis 60. The two generally semi-elliptically shaped surfaces 212, 214 lie on an imaginary frusto-conical surface whose apex lies substantially on axis 60. The resulting intersection between the imaginary frusto-conical surface defined by the surfaces 212, 214 and the imaginary plane surfaces defined by inclined surfaces 208, 210 are represented by the respective lines 220, 222. These lines 220 and 222 do not appear semi-circular in FIG. 14 because the surfaces 208 and 210 are inclined rather than being perpendicular to axis 60. If they were perpendicular to axis 60, the two lines 220, 222 would be semi-circular in shape.

Although end face 162 does have a complex surface contour, it can be conveniently fabricated by the surprisingly simple expedients of milling and drilling. Milling is used to form the respective surfaces 208, 210 while surfaces 212, 214 are formed by the tip of a drill that is axially advanced along axis 60 toward end face 162. In the position of assembly 40 shown in FIG. 4, the rounded end 130 of lever 58 is seated at the bottom of surfaces 212, 214 concentric with axis 60.

Disposed interiorly of assembly 40 and mounted on the inner face of end wall 68 just radially interiorly of shoulder 72 (see FIG. 4A also) is a circular annular switch array 226. There are four individual switches S1, S2, S3, S4 in the circular annular array, one switch located centrally per each 90 degree quadrant as shown in FIG. 4A. The four switches are preferably individual sealed membrane switches that are normally open. The membrane switches themselves are overlaid by compressible, resilient actuating pads 230, 232, 234, 236, respectively. The depression of a corresponding pad will serve to close the corresponding membrane switch. In its free condition, each pad has an arcuate shape of uniform radial width and uniform thickness. Wires 237 from the respective switches enter the left hand end of keyway 80 and are carried through the keyway to the right hand end of the body where they pass through a hole 239 in disc 122 to exit through adapter 44 and enter column 42 from whence they ultimately lead to electrical circuitry that is under the control of switch assembly 40.

Lever 58 selectively operates the switches of array 226 by means of disc 128. Exactly how this occurs will now be explained for the following switch settings: hazard warning; left turn signal; right turn signal; headlight dimmer; and marker interrupt.

The hazard warning function is given by pulling the lever outwardly from the FIG. 4 to the FIG. 5 position. In the FIG. 5 position, element 126 has been displaced outwardly within bore 74, in turn causing the margin of the perimeter of disc 128 to depress all four pads of array 226, correspondingly closing all four switches of the array. While a pad obviously deforms when depressed, such deformation may be somewhat difficult to see in the drawings; accordingly, the reader will understand that such deformation does occur even though it may not be overtly apparent in some of the drawing FIGS. The concurrent closure of all four switches is read as commanding the hazard warning function to be given, and therefore at this time, those lamps of the vehicle that are customarily flashed to give the hazard warning are operated. It is to be observed in FIG. 5 that spring 158 has axially expanded to continue to maintain the end face 162 of the piston seated against the rounded end 130 of lever 58.

Knob 62 is shaped with a stem 63 that is adapted to abut the axially outer end of element 126 when the hazard warning signal is to be cancelled. Accordingly, pushing knob 62 inwardly from the FIG. 5 position will initially displace lever shaft 58 inwardly to produce a slight unseating of sphere 124 from seat 138 before the end of knob stem 63 abuts element 126. Continued urging of the knob along axis 60 will force element 126 back fully into bore 74 and in turn cause disc 128 to release the four switches of array 226 thereby returning the switches S1, S2, S3, S4 to open conditions.

Although lever 58 is capable of full frustoconical swiveling motion on seat 138, the ball and socket type joint is used for four basic directions of pivotal motion of the lever in directions that are 90 degrees apart as viewed axially of axis 60 and that perform four distinct functions. FIG. 6 illustrates motion in one of these four directions which is effective to give a left turn signal. This position is attained by pulling the lever down from the position shown in FIG. 4, with the action taking place as follows.

As the lever is being pulled down, the rounded end 130 rides upwardly along slot 190 bearing against the edges of surfaces 212, 214 that lie on either side of the slot. When the full limit of lever motion has been reached as represented by FIG. 6, the rounded end 130 of the lever has travelled past the lines 220 and 222 and is now resting on the surfaces 208, 210 approximately at the location indicated by the reference numeral 228 in FIGS. 14 and 16. The greater inclination (relative to axis 60) of surfaces 208, 210 compared to that of surfaces 212, 214 creates an over-center (or detent-type) effect as the lever end passes lines 220 and 222 whereby the lever will tend to remain stable in this position 228 on surfaces 208, 210 until it is cancelled, either manually or by the energization of electromagnet 168. With the lever in the position of FIG. 6, disc 128 is depressing only pad 230 and therefore only switch S1 is being closed. This condition of the switches, namely, switch S1 closed, the other three switches S2, S3, S4 open, represents a left turn command causing the appropriate left turn indicating lamp to be flashed.

Manual cancellation by rotating lever 58 clockwise from the FIG. 6 position is effective to displace the plunger slightly to the right against spring 158 until the over-center condition is passed. Thereafter, there is slight movement of the piston to the left as the nose end 130 of the lever rides down the ramp surface toward axis 60. In this regard, it is to be noted that the relative interaction between the detent mechanisms 152, 154 on the one hand and spring 15B on the other hand is such that the detents exert a stronger holding force whereby element 126 remains in place and the travel of the piston is taken up by spring 158.

A right turn signal is given in similar manner by operating lever 58 from the FIG. 4 position in the upward direction exactly opposite the direction that was used to give the left turn signal. The specific condition for a right turn signal is not illustrated in the drawings but is believed readily understandable from the foregoing description of operation for a left turn signal. In the right turn signal condition, the rounded nose of the lever has travelled along the opposite direction of slot 190 from what it did when the left turn signal was given. Accordingly, it will go over-center (detent effect) to rest on the areas indicated by the reference numeral 229 in FIGS. 14 and 16 until cancelled. When the right turn signal command is being given, disc 128 is depressing pad 232, closing switch S2 while the other three switches S1, S3, S4 remain open. Hence, this particular condition of the switches is indicative of a right turn signal and causes the right turn signal lamps of the vehicle to be flashed.

The automatic cancellation of either a right or a left turn signal occurs by energizing electromagnet 168. When the electromagnet is energized, plunger 170 is pulled more inwardly into piston 156. Since the plunger and electromagnet form a unit, bobbin 172 is also moved more inwardly, resulting in wall 192 protruding outwardly more fully through slot 190. Such protusion of ramp surfaces 194, 196 will cause a particular one of them (depending on direction of turn) to engage the rounded end 130 of the shaft. The amount of travel of the electromagnet/plunger unit, relative to the piston, is equal to the amount by which the element 188 is capable of being axially compressed. This amount is sufficiently great that the ramp surfaces 194, 196 can move axially outwardly beyond the surfaces 208, 210, 212 and 214 in the piston end face 162. Although the electromagnetic force is directed in the direction which tends to urge lever 58, and hence element 126, to the left, detent mechanisms 152, 154 hold element 126 in place so that the relative motion between the electromagnet/plunger unit and the piston now results in the piston traveling to the right relative to the electromagnet/plunger unit, the piston compressing spring 158 in the process.

The passage of ramp surfaces 194, 196 through end wall 161 beyond end face 162 unseats the rounded end 130 of shaft 58 from end face 162 causing the rounded end of the shaft to bear solely against the corresponding ramp 194, 196. The ramp angle is sufficiently large in relation to the force acting on the rounded end 130 of shaft 58 that a camming effect occurs on the lever causing tip 130 to ride down the ramp and resulting in lever 58 pivoting back into colinearity with axis 60. Disc 128 therefore relieves the corresponding switch actuator pad that it had been depressing, and consequently the corresponding switch returns to open condition. Hence, the cancellation function is completed insofar as termination of the command signal is concerned. The electromagnet is de-energized at a time sufficiently long after its initial energization to assure that such cancellation has occurred. Upon de-energization of the electromagnet, the electromagnet/plunger unit retracts within the piston so that the rounded end 130 of shaft 58 re-seats at the center of face 162; in other words, it returns to the position depicted by FIG. 4.

It should be pointed out that as the lever is pivoting back toward colinearity with axis 60, a force continues to be exerted on the tip because the piston continues to be urged axially within body 64 toward the lever by the force of spring 158. In other words, during the cancellation, piston 156 will travel slightly to the left from the FIG. 7 position. The retraction of wall 192 that occurs when the electromagnet is de-energized is accompanied by a still further movement of piston 156 toward the lever so that re-seating of the lever at the center of face 162 is attained.

Operation of lever 58 about center 140 in directions that are at 90 degrees to the directions for right and left turn signal actuations are used respectively to perform the headlamp dimmer function and the marker lamp interrupt function. When one of these latter two functions is to be performed, the rounded end 130 of lever 58 will travel in a direction that is transverse to the directions for actuating the right and left turn signals. In FIG. 14, the arrow 132 indicates the direction of travel of the rounded end 130 of lever 58 for the dimmer function and the arrow 133 indicates the direction of travel for the marker lamp interrupt function.

Throughout the range of lever travel for the dimmer function, the rounded lever end 130 will remain on surface 212. Similarly, throughout the range of lever travel for the marker lamp interrupt function, the lever end will remain on surface 214. When the lever has been operated for the dimmer function, disc 128 is depressing pad 234 causing switch S3 to be closed while the other three switches S1, S2, S4 remain open. Similarly, when the lever has been operated for the marker lamp interrupt command, disc 128 is depressing pad 236 causing switch S4 to be closed while the other three switches S1, S2, S3 remain open.

The angle of each surface 212, 214 (relative to axis 60) along the direction of lever tip travel is such that as soon as the manually actuated lever is released, it will inherently be cammed down the same surface, returning to the position that is coaxial with axis 60. In other words, both the dimmer and the marker lamp interrupt functions are not latched switch functions.

Since the typical mode of marker lamp interrupt signalling by the operator of a highway truck involves momentarily interrupting the illuminated marker and clearance lamps, once or perhaps several times, the typical operation of lever 58 to perform the marker lamp interrupt function will comprise the lever being pivoted in the appropriate direction and momentarily held there before it is released to return to the off position. This operation may be performed once, or perhaps several times, to give the desired signalling effect.

The typical headlamp dimmer function in a heavy duty highway truck comprises switching of the headlamps from high beam to low beam, and vice versa, whenever the headlamps are on. Hence, when the lever is operated in the appropriate direction to close switch S3, it is the change of state of switch S3 that causes the state of brightness of the headlamps to change, not the duration for which switch S3 remains closed. In order to once again change the state of the headlamps, switch S3 must be opened and then again closed. This is done by releasing the lever after the switch has once been actuated and then reactivating the lever when it is next desired to change the state of the headlamps.

Thus, the unique organization and arrangement of switch assembly 40 enables the single lever that is disposed conveniently adjacent the steering wheel rim: to give the usual right and left turn signal commands by pivoting of the lever in right and left turn signal directions that are generally in a plane that is generally parallel to the plane of rim 48; to give a marker interrupt signal command by momentarily pivoting the lever in a direction away from the plane of the rim; to switch the headlamps from high to low beams, and vice versa, by pulling the lever toward the rim; and to give a hazard warning command by pulling the lever axially outwardly from the switch body generally parallel to the plane of the rim.

Because of the crescent-shaped construction of surfaces 208, 210, it is possible, when the lever is in either turn signalling position, to rock the interior end 130 of lever 58 circumferentially in either direction without the end of the lever leaving one or the other of these surfaces, depending on the sense in which the lever is rocked. A certain amount of such rocking in one sense will be effective to cause the headlamp dimmer switch to be concurrently actuated, while a certain amount of rocking in the opposite sense will be effective to cause the marker lamps to be concurrently interrupted. Hence, it is possible both to actuate the dimmer switch and to interrupt the marker lamps while either turn signal is being given, and in the absence of cancellation by cancellation mechanism, the lever will tend to return by itself to the turn signal only position on end face 162 after the circumferential rocking motion imparted to the lever has ceased. Due to the nature of the pivotal action in relation to the arrangement of the switches of array 226, it should be apparent that the dimmer switch function cannot be given concurrently with the marker lamp interrupt function, just as the left turn signal cannot be given conourrently with the right turn signal.

Details of a switch array 240 that is associated with actuator 54 will now be described. In the developed view of FIG. 17, switch array 240 is seen to occupy the space that is bounded axially of body 64 essentially by the two series of detents 106 and 108 and circumferentially essentially by the stops 98 and 102. Although in the developed view of FIG. 17 the switch array has a rectangular overall shape, the true shape is curved for fitting onto the curvature of the bottom wall 86 of channel 82.

Switch array 240 comprises five switches arranged in two side-by-side, circumferentially extending rows. Switches S11, S13 and S15 are in one row while switches S12 and S14 are in the other row. In each row the switches are disposed at regular intervals, but the switches of one row are offset from those of the other row by an amount equal to one-half of an interval.

Each switch S11, S12, S13, S14, S15 is preferably a sealed membrane type switch that is overlaid by a corresponding actuator pad 242, 244, 246, 248, 250. Although FIGS. 17-19 show developed views of the switches and the actuator pads and the following detailed description will be given with reference to the developed views it is to be understood that like the membrane switches, the pads too are curved for fitting the curved bottom wall 86 of channel 82.

Each switch is located centrally beneath a corresponding actuator pad. The actuator pad has a generally square shape that comprises a square bottom wall 260 and congruent regular trapezoidal shaped sidewalls 262 which in turn serve to define a top wall 264 parallel to bottom wall 260 and inclined end walls 266 that incline from the circumferentially spaced apart forward and rear edges of top wall 264 to the circumferentially spaced apart forward and rear edges of bottom wall 260. The pads are proportioned such that each underlying switch is fully overlaid by the corresponding pad. Each pad protrudes radially outwardly in an amount sufficient to be depressed by a depressor (hereinafter to be described) on actuator 54. Depression of the top wall of a pad by this depressor is effective to close the underlying switch. Moreover, depression, by the depressor, of those portions of the inclined end walls immediately contiguous the top wall of a pad will also be effective to close the underlying switch; however at some point along the end walls in the directions away from the top wall, the depressor will be incapable of depressing a sufficient amount of the pad to close the underlying switch. Thus, each pad has a central region, including the top wall, but of a larger expanse than just the top wall, that will actuate the underlying switch when depressed by the depressor on the actuator. In order to understand how the switches are actuated by this depressor, it is necessary to consider the detailed actuator construction.

Shown in FIG. 4A, actuator 54 comprises a split ring portion 268 that is fitted onto channel 82. The material from which the actuator is fabricated has a certain resiliency that allows the split ring portion to be circumferentially expanded in a sufficient amount for the actuator to be slid axially over body 64 and become seated in channel 82. When so seated, the actuator is capable of arcuate motion in the circumferential sense about the switch body to selectively actuate the switches of switch array 240.

The split ring portion has a uniform width and a circumferential extent of slightly less than 360 degrees. A pair of raised pads 270 and 272 of about 60 degrees arcuate extent each are fashioned on the inside face of the split ring adjacent each side of the split. These pads have dimensions that serve to fit closely within channel 82 to guide the actuator for circumferential motion about body 64. The split ring portion is slightly wider than the pads so that the marginal side edges of the split ring portion cover the series of detents 106, 108. Projecting radially outwardly of the split ring portion at its circumferential midpoint is an actuator tab 274 that is used by the vehicle operator to rotate the actuator about the switch body either by pushing or pulling the tab.

The depressor (previously referred to) for depressing the pads to operate the switches of array 240 comprises a bar 276 fashioned on the inner face of the split ring portion directly beneath the actuator tab. The depressor bar extends widthwise of the split ring (longitudinally of the switch assembly). It has a length that is slightly greater than the widths of the pads 270 and 272 but just slightly less than the overall width o split ring portion 268 so that the opposite longitudinal ends of the depressor bar will ride along the series of detents 106, 108 as the actuator is moved circumferentially in channel 82. The actuator bar has a height (radial dimension relative to axis 60) that is sufficient to depress the central region (defined above) of an underlying pad, causing the corresponding underlying membrane switch to be closed. Although the drawings show the depressor bar as integrally formed with the actuator, it could just as well be a separate element in the form of a roller having a longitudinal axis that is parallel to axis 60 and journalled on the actuator.

The disclosed organization and arrangement of the series of detents 106, 108 defines three circumferentially consecutive valleys V1, V2, V3. Hence, actuator 54 will have three discrete settings corresponding to depressor bar 276 being disposed at the bottom of each of the three valleys V1, V2, V3. The switches are arranged in relation to these valleys in the following manner. When the depressor bar is at the bottom of the remaining four switches S12, S13, S14, S15 remaining open. When the depressor bar is at the bottom of valley V2, it is depressing both a portion of pad 244 and a portion of pad 246 such that both switches S12 and S13 are closed while the other three switches S11, S14, S15 are open. When the depressor bar is at the bottom of valley V3, it is depressing pads 248 and 250 causing both switches S14 and S15 to be closed while switches S11, S12 and S13 are open. The operating conditions of the five individual switches of array 240 for the three discrete settings are thereby defined.

One of the advantages of the organization and arrangement is that additional unique switch conditions for the array are made possible in a limited range about the bottom of each valley. More specifically, when the depressor bar is in valley V1 closing only switch S11, the counterclockwise limit of rotation, as viewed in FIG. 4A, has not yet been reached. Accordingly, additional counterclockwise rotation will result in the depressor bar riding up the surfaces of detents 106, 108 toward stops 98 with the result that pad 242 is released thereby opening switch S11 so t hat all five switches are now open. The nature of the spilt ring portion of actuator 54 is such that the actuator will tend to inherently return to a discrete detent position (valley bottom) after the force used to rock it up either side of the valley has been relieved.

In like manner, when the actuator is operated to move the depressor bar from the bottom of valley V1 in the direction of valley V2, but still remaining in valley V1, a point is reached where both switches Sll and S12 will be closed. Once again, this is a momentary condition and when the force on actuator tab 274 is released, actuator 54 will return to the position where the depressor bar is at the bottom of valley V1.

When the depressor bar is placed at the bottom of valley V2, a certain amount of motion in one direction up one side of the valley will maintain switch S12 closed while allowing switch S13 to open; motion up the other side of the valley will result in switch S14 being closed while switch S13 remains closed.

In still like fashion, when the depressor bar is at the bottom of valley V3 and displaced up one side of the valley, switch S15 will be opened while switch S14 remains closed; motion up the opposite side of valley V3 will result in switch S15 remaining closed while switch S14 is opened.

Therefore, when the depressor bar is at the bottom of any of the valleys, there is a certain position up either side of the valley which can create a different overall switching pattern from that which exists when the depressor bar is at the bottom of the valley. This capability is particularly useful for switching certain types of automotive electrical circuits, and its advantages will become more apparent from the ensuing description.

Since one end of the array overlaps keyway 80, wires (not shown) from the switches of the array may be conducted via a radial passage 279 (FIG. 12) through sidewall 66 to intercept keyway 80, and then pass through the keyway in the same manner as wires 237. Other electrical wires (not shown) may be conducted in the same way to provide for the nighttime illumination of the settings of the actuator.

The other actuator 56 is essentially identical with actuator 54 and is cooperatedly associated with a membrane switch array and pads that are exactly identical to switch array 240 and its associated pads. The action of actuator 56 with the five switches of its array is exactly the same as that described and portrayed by FIG. 17-19 for array 240. Therefore, a detailed description for actuator 56 and its switch array would be duplicative and hence is not included.

The one noticeable difference between the two actuators 54 and 56 is that in actuator 54, tab 278 lies in a plane that is perpendicular to axis 60, while actuator 56 has its tab 282 (FIG. 1) lying in a plane that includes axis 60. This difference in orientation of the two tabs is for convenience in distinguishing one from the other, not only by appearance, but also by feel. Such distinction by feel may be useful to a vehicle operator since he may be able to identify each of the two actuators manually without having to take his eyes off the road when he desires to operate an electrical device that is under the control of a particular one of the two actuators.

Figure 20:
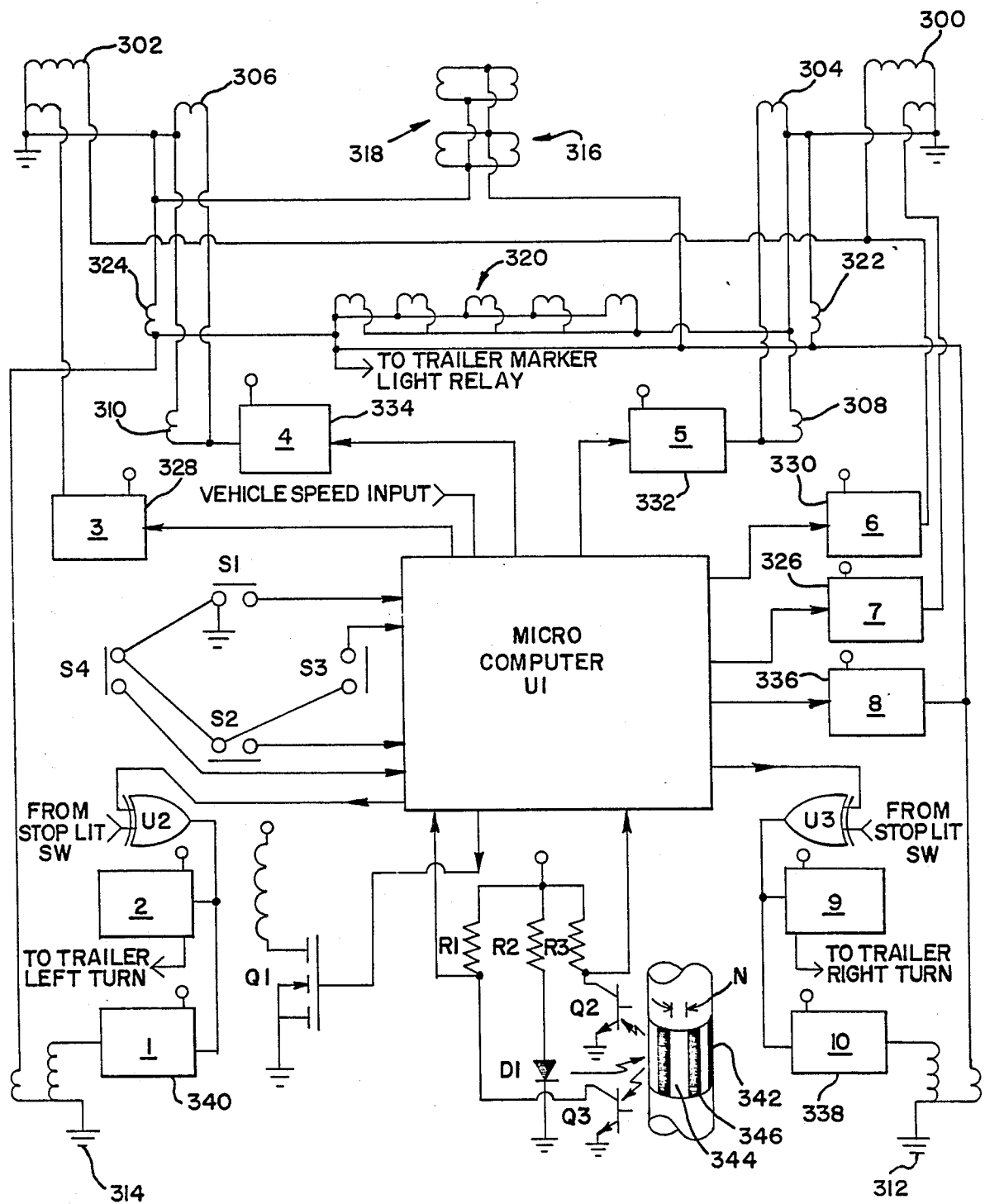
FIG. 20 is an electrical schematic diagram of certain ones of the electrical circuits under the control of the switch.

FIG. 20 illustrates a schematic diagram of a representative heavy truck lighting system that is controlled by the array 226 of switches S1, S2, S3 and S4 of switch assembly 40. One terminal of each of these four switches is grounded, and the other terminal of each switch connects to a corresponding input of a microcomputer U1. The microcomputer U1 is configured to read particular conditions of the four switches of the array and provide appropriate command signals at various outputs for the purpose of operating various lamps on the vehicle in accordance with commands established by the switches of the array.

The vehicle lamps that are depicted in FIG. 20 include the following: right and left headlamps 300, 302 respectively, each of which is a dual filament lamp having high and low beam filaments; right and left front exterior turn signal lamps, 304, 306, respectively; right and left turn indicator lamps 308, 310, respectively, which are on the interior instrument panel; right and left rear exterior lamps 312, 314, respectively, each of which is a dual filament lamp containing a stop lamp filament and a tail lamp filament; right and left park and side marker lamps 316, 318, respectively; cab clearance and identification lamps 320 (marker lamps); and right and left mirror lamps 322, 324, respectively.

Microcomputer U1 does not directly drive the various lamps but rather controls "smart" switches, through each of which a corresponding lamp, or lamps, is, or are, connected with the vehicle power supply, either directly or through additional switching. A smart switch is a semiconductor device designed to switch power loads from commands received from CMOS or TTL logic and can operate directly from MPU outputs. An example of such a device is part number MPC 1500 from Motorola Semiconductors, Phownix, Ariz. Hence, the low beam filaments of headlamps 300, 302 are connected through respective smart switches 326, 328; the high beam filaments of the two headlamps are connected through a common smart switch 330; the right front turn signals, including lamps 304 and 308, are connected through a smart switch 332; the left front turn signals, including lamps 306 and 310, are connected through a smart switch 334; and lamps 320, 322, 324, as well as the tail lamp filaments of the right and left rear lamps 312, 314 are connected through a common smart switch 336. All the smart switches just mentioned connect their corresponding loads directly to the battery, save for switches 336, 326, 328 and 330 which connect to the battery through an on-off headlight switch (not shown) that must be turned on in order to connect these particular three smart switches to the vehicle power supply.

The stop lamp filaments of the right rear and left rear turn signal lamps are connected through their own smart switches 338, 340, respectively, to the output of a corresponding Exclusive Or gate U3, U2, respectively. One input to each Exclusive Or gate U2, U3 is from a corresponding output of microcomputer U1 while the other input of each Exclusive Or gate is from the stop lamp switch (not shown) that is used to actuate the rear stop lamps when the brakes of the vehicle are operated.

Microcomputer U1 monitors the conditions of the four switches S1, S2, S3, S4, and provides corresponding commands at the appropriate outputs in accordance with the logic techniques previously describeed. The use of the two Exclusive Or gates with the two smart switches 338, 340 is so that the turn signal and hazard warning functions will override the stop lamp function whereby a corresponding flashing of the stop lamp or lamps in response to a turn signal or hazard warning command from switch 40 will appear at the rear even if the stop lamp switch is being concurrently actuated.

The microcomputer U1 is also used in performance of the automatic turn signal cancellation function. The steering shaft is provided with a circumferentially extending strip 342 that confronts the interior of adaptor 44. The strip comprises alternately reflective and non-reflective parallel bars 344, 346 respectively. The adaptor contains a light emitting diode (LED) D1, that is arranged to shine light onto band 342. Sensing of reflected light is by means of a pair of phototransistors Q2, Q3 which are spaced from each other within the adapter a distance N plus one-half N bars, the bars of strip 342 being of uniform widths N. The two phototransistors sense both rotation and direction of rotation of the steering shaft to provide information to microcomputer U1 for cancelling the turn signal function.

Based upon the direction of turn selected by lever 40, and the ensuing response of the steering system, as presented by the rotation and direction of rotation of the steering shaft, the passage of the alternate bands across the adaptor face results in waveform patterns being generated by the two phototransistors Q2 and Q3. When a predetermined pattern is detected indicating that a turn has been made and completed, the microprocessor issues a signal to a further transistor Q1 which energizes electromagnet 168 for a sufficient amount of time to cause lever 58 to return from the turn signal commanding position back into coaxial alignment with axis 60. Of course the microcomputer is responsive to other conditions for cancelling the turn signals, such as those mentioned earlier.

FIG. 21 is a schematic diagram illustrating the manner in which the switches of array 240 are connected with a typical cruise control circuit. The off position of the cruise control is defined by the depressor bar 276 being at the bottom of valley V1 so that only switch S11 is closed. Closure of switch S11 applies a ground signal to a smart switch 400 that is in the power line from the vehicle ignition switch 402 to a cruise control module 404. This prevents the cruise control module from being activated.

The cruise control module is turned on by operating actuator 54 to move the depressor bar to the bottom of valley V2. This closes both switches S12 and S13. The inputs to both switches S12 and S13 are from ignition switch 402. The outputs from the two switches S12, S13 go to respective inputs of respective Exclusive Or gates 406, 408. The other inputs of the Exclusive or gates connect to ignition switch 402. The outputs of the two Exclusive Or gates in turn connect to the cruise control module.

When actuator 54 has been set to turn the cruise control on, the standard cruise control functions of "setting speed" and "resuming speed" are accomplished by rocking the actuator about the second detent position to selectively operate only switch S12 for setting speed and only switch S13 for resuming speed. The switches S14 and S15 are not used in this specific embodiment but are available for use in future or other designs if needed.

FIG. 22 illustrates a schematic circuit that utilizes the switches of the array that is associated with actuator 56 for controlling the vehicle's windshield wiper motor 500. The five switches of the array are designated S21, S22, S23, S24, and S25 corresponding to switches S11, S12, S13, S14 and S15, respectively. When actuator 56 is operated to place its depressor bar at the first detent position (its valley V1), only switch S21 is closed. This is the off position and a corresponding signal is supplied to microcomputer U1. The microcomputer operates the motor via smart switches 502, 504.

Operation to the second detent position (bottom of valley V2) creates the intermittent wipe mode of operation for the wipers. At this time, both switches S22 and S23 are closed. By rocking the actuator to either side of the second detent position, while still remaining in valley V2, it is possible to increase or decrease the wipe delay. For example, the delay is increased by rocking the actuator in the direction of the first detent to open switch S23 while maintaining switch S22 closed; the wipe delay is decreased by rocking the actuator in the direction of the third detent (valley V3) to open switch S22 while maintaining switch S23 closed.

Continuous wiping action is produced by operating the actuator to the bottom of the third detent. This closes both switches S24 and S25. It is possible to decrease the wipe speed by rocking the actuator in the direction of the second detent, while still remaining in valley V3, thereby momentarily opening switch S25 while maintaining switch S24 closed. Similarly, it is possible to increase the wiping speed by rocking the actuator in the opposite direction so that switch S25 remains closed while switch S24 is momentarily opened.

The microcomputer is responsive to the durations for which the switches are maintained in their momentarily rocked conditions and adjusts the delay or the speed (as the case may be) in accordance with that amount of time.

The circuit further shows a switch S31 that is adapted to operate the windshield washer pump motor 506 to cause washer fluid to be dispensed onto the windshield. The switch S31 is actuated by depressing knob 62 inwardly from the FIG. 4 position to similarly displace lever 58 to actuate switch S31. The microcomputer controls the motor via a smart switch 508.

Although cruise control has been illustrated as the use for actuator 54 and its switch array 240, not every vehicle may be equipped with such an accessory. Accordingly, other circuits could be placed under the control of this actuator and array, the headlamps and parking lamps being one example. In such case, valley V1 would be the "off" position, valley V2 the "parking lamps on" position, and valley V3 the "headlamps on" position.

The switch of this invention, when combined with the microcomputer, is capable of accommodating certain changes in design specifications with little or no alteration of hardware because many changes can be implmented in the software that operates the microcomputer. In this regard, it is to be appreciated that specific software can be selected, as required, in accordance with known technology to implement the disclosed, or other functions, that the microcomputer is to perform.

While a presently preferred embodiment of the invention has been disclosed, it will be appreciated that principles are applicable to other embodiments.

What is claimed is:

1. A multi-function turn signal switch for an automotive vehicle comprising a switch body having a longitudinal axis, a lever that has an exterior end disposed exteriorly of the switch body for operating the lever and an interior end that is disposed interiorly of the switch body, a mount for mounting the lever between its ends on the switch body to enable the interior end of the lever, when operated via its exterior end, to describe a frustoconical zone of motion within the switch body with the apex of the frustoconical zone of motion lying on said longitudinal axis, means acting against the interior end of said lever to create plural discrete positions for the lever circumferentially around the frustoconical zone of motion for giving signals, including right and left turn signals, at each of which discrete positions the lever will be retained when operated to that position, plural electrical switches arranged on said switch body in a circumferentially extending array about said axis and each of said electrical switches being particular to a particular one of said discrete positions of the lever, and switch actuating means on said lever for actuating the particular electrical switch that is particular to the corresponding one of said discrete positions of said lever when the lever is operated to that position.

2. A multi-function turn signal switch as set forth in claim 1 in which said plural discrete positions for the lever comprise two particular positions that are spaced circumferentially 180 degrees apart about the frustoconical zone of motion, said two positions being the positions for giving the right and left turn signals.

3. A multi-function turn signal switch as set forth in claim 2 in which two of said plural electrical switches are disposed 180 degrees apart about said axis and respectively actuated by said switch actuating means when the lever is operated to each of said two positions respectively to give the right and left turn signals respectively.

4. A multi-function turn signal switch as set forth in claim 3 in which said switch actuating means comprises a circular disc disposed transversely on the lever between said mount and the interior end of the lever.

5. A multi-function turn signal switch as set forth in claim 3 in which said lever is also disposed for longitudinal bodily displacement along said longitudinal axis relative to the switch body to perform additional modes of switch actuation.

6. A multi-function turn signal switch as set forth in claim 5 in which said lever is arranged for longitudinal bodily displacement along said axis in a direction outward of the switch body, said mount is arranged for outward bodily displacement along said axis along with said lever, and the outward longitudinal displacement of said lever and said mount relative to said body along said axis is effective to cause said switch actuating means to simultaneously actuate both of said two switches.

7. A multi-function turn signal switch as set forth in claim 1 in which said means acting against the interior end of said lever to create said plural discrete positions for the lever circumferentially disposed around the frustoconical zone of motion also creates at least one further discrete position for the lever that is circumferentially between the first-mentioned plural discrete positions to which said lever can be operated but that is ineffective to retain the lever when the lever is operated to such at least one further discrete position when force that was applied to the exterior end of the lever to move the lever to such at least one further discrete position has been removed, and at least one further electrical switch, each of which is additional to said plural electrical switches and is particular to a corresponding one of each of said at least one further discrete position for the lever, said switch actuating means being arranged to actuate a particular one of said at least one further electrical switch that is particular to a corresponding one of said at least one further discrete position for the lever when the lever is operated to that corresponding position.

8. A multi-function turn signal switch as set forth in claim 7 in which said means acting against the interior end of the lever is constructed and arranged to permit the interior end of the lever to be displaced a limited circumferential amount within the frustoconical zone of motion while remaining in one of said first-mentioned plural discrete positions when the exterior end of the lever is circumferentially displaced a limited amount while being operated to said one of said first-mentioned plural discrete positions, and said switch actuating means is effective for such displacement of the lever to simultaneously actuate both the particular one of said first-mentioned plural electrical switches that is particular to said one of said first-mentioned plural discrete positions and also a particular one of said at least one further electrical switch.

9. A multi-function turn signal switch as set forth in claim 7 in which all said electrical switches are arranged in a circular array that is transverse to said axis, and said switch actuating means is disposed transversely on the lever between said mount and the interior end of the lever.

10. A multi-function turn signal switch as set forth in claim 9 in which said first-mentioned plural electrical switches are two in number, said at least one further electrical switch is two in number, and these four switches are arranged at 90 degree intervals around the circular array.

11. A multi-function turn signal switch as set forth in claim 10 in which said two of said first-mentioned plural electrical switches are operable for giving right and left turn signals respectively via associated signalling circuitry when each said two of said first-mentioned plural electrical switches is respectively actuated by said switch actuating means, and said two of said at least one further electrical switch are operable for giving two additional different exterior lighting signals respectively on the vehicle via said associated signalling circuitry when each of said two of said at least one further electrical switch is respectively actuated by said switch actuating means.

12. A multi-function turn signal switch as set forth in claim 11 in which said lever is also disposed for longitudinal bodily displacement along said longitudinal axis relative to the switch body in a direction outward of the switch body, said mount is arranged for outward bodily displacement on said body along said axis along with said lever, and the outward longitudinal bodily displacement of both said lever and said mount relative to said body along said axis is effective to cause said switch actuating means to simultaneously actuate both said two of said first-mentioned plural electrical switches and also said two of said at least one further electrical switch for giving a still additional different exterior lighting signal on the vehicle via said associated signalling circuitry.

13. A multi-function turn signal switch as set forth in claim 12 in which said first two mentioned different exterior lighting signals are the headlamp dimmer control signal and the marker lamp interrupt signal, and the still additional different exterior lighting signal is the hazard warning signal.

14. A multi-function turn signal switch as set forth in claim 9 in which said lever is also disposed for longitudinal bodily displacement along said longitudinal axis relative to the switch body in a direction outward of the switch body, said mount is arranged for outward bodily displacement on said body along said axis along with said lever, and the outward longitudinal bodily displacement of both said lever and said mount relative to said body along said axis is effective to cause said switch actuating means to simultaneously actuate both said two of said first-mentioned plural electrical switches and also said at least one further electrical switch for giving an additional different exterior lighting signal on the vehicle via associated signalling circuitry.

15. A multi-function turn signal switch as set forth in claim 14 in which said mount has a throughbore comprising a generally semi-spherical seat that faces axially inwardly of said body, said lever passes through said throughbore and comprises a spherically contoured portion that seats in said seat to provide for the lever to operated to describe the frustoconical zone of motion, said lever is also arranged for bodily displacement inwardly relative to said mount to unseat said spherically contoured portion from said seat, means, including detent means, defining two discrete axial positions of displacement for said mount among said axis relative to said switch body, said mount occupying one of its two discrete positions relative to said switch body when said lever and mount have both been displaced outwardly on said body along said axis to cause said switch actuating means to simultaneously actuate said two plural electrical switches and said at least one further electrical switch, and when said mount occupies said one discrete axial position, a portion thereof protrudes from said switch body, said lever comprising a knob at its exterior end for abutting the protruding portion of said mount after inward displacement of the lever has slightly unseated said spherically contoured portion from said seat, and upon further inward displacement of said lever after said knob has abutted the protruding portion of said mount, the lever is effective to displace the mount axially inwardly on said switch body to the other of said two discrete axial positions.

16. A multi-function turn signal switch as set forth in claim 15 in which said mount is disposed in a bore in an end wall of said switch body and said circular array of said electrical switches is disposed on the interior face of said end wall.

17. A multi-function turn signal switch as set forth in claim 15 in which all said electrical switches are sealed membrane switches, and including resiliently compressible pad structure overlying said membrane switches and through which said switch actuating means is effective to actuate said membrane switches.

18. A multi-function turn signal switch as set forth in claim 1 in which said means acting on the interior end of the lever comprises the axial end face of a member that is longitudinally moveable within said switch body along said axis and is resiliently biased in the longitudinal direction along said axis against the interior end of the lever.

19. A multi-function turn signal switch as set forth in claim 18 in which said member carries a selectively operable cancellation mechanism that is effective, when activated, to return the lever from said discrete positions on said axial end face of said member to a longitudinal position coaxial with said longitudinal axis.

20. A multi-function turn signal switch as set forth in claim 19 in which said cancellation mechanism comprises a further member that is resiliently biased on the first-mentioned member in the direction away from the interior end of the lever, and said cancellation mechanism further comprises an electrically activated force-producing means that is effective, when activated, to operate said further member to return the lever to longitudinal position coaxial with said longitudinal axis.

21. A multi-function turn signal switch as set forth in claim 20 in which the axial end face of said first-mentioned member comprises plural surface portions creating an over-center transition for the lever as the interior end of the lever moves between one surface portion and another, said over-center transition serving to retain said lever in said discrete positions when the lever has been operated thereto, said axial end face of said first-mentioned member having an opening longitudinally therethrough, and said further member comprising a surface portion that, when said force-producing means is activated, is displaced through said opening to engage the interior end of the lever, to unseat it from said axial end face of said first-mentioned member, and to cause the lever to return to longitudinal position coaxial with said longitudinal axis.

22. A multi-function turn signal switch as set forth in claim 21 in which said surface portion of said further member comprises a ramp that is at an angle to said longitudinal axis and extends substantially to said longitudinal axis.

23. A multi-function turn signal switch as set forth in claim 22 in which said first-mentioned member has a central seat that is at said longitudinal axis, and when said force-producing means is de-activated, said further member retracts longitudinally to cause the interior end of the lever to seat on the central seat of said first-mentioned member.

24. A multi-function turn signal switch as set forth in claim 1 in which said plural discrete positions are arranged 180 degrees apart about the frustoconical zone of motion, and said means acting against the interior end of the lever to create said plural discrete positions comprises a member that is displacable longitudinally of said longitudinal axis, that has an end face which engages the interior end of said lever, and that is resiliently biased against said lever, and further including a selectively operable cancellation member that is also longitudinally displaceable along said longitudinal axis, said cancellation member is resiliently biased on the first-mentioned member in the opposite direction from that in which said first-mentioned member is resiliently biased into engagement with said lever, a diametrical slot in said end face, and said cancellation member has a diametrical wall fitting in said slot, said wall has ramp surfaces that diverge from said longitudinal axis 180 degrees apart circumferentially about said longitudinal axis, said ramp surfaces being organized and arranged such that when the turn signal switch is giving a turn signal and said force-producing means is activated, said ramp surfaces are projected outwardly through said slot beyond said end face such that one of said ramp surfaces engages the interior end of said lever, unseats the interior end of the lever from said end face, and the interior end of the lever rides back down the ramp surface that unseated it until the lever assumes coaxiality with said longitudinal axis.

25. A multi-function turn signal switch as set forth in claim 24 includes means for causing the interior end of said lever to re-seat on said end face when said force-producing means is de-activated.

26. A multi-function turn signal switch as set forth in claim 24 in which said first-mentioned member is a piston that slides axially within a bore in said switch body, said cancellation member is a cylindrical bobbin that slides axially within a bore portion of said piston, said ramp surfaces are disposed on an end wall of said bobbin, and said force-producing means comprises an electromagnetic coil that is disposed on said bobbin.

27. A multi-function turn signal switch as set forth in claim 26 in which said end face faces toward said switches, and said switch actuating means on said lever lies axially between said switches and said axial end face.

28. A multi-function turn signal switch is set forth in claim 27 in which said mount has a throughbore comprising a generally semi-spherical seat that faces axially inwardly of said body, said lever passes through said throughbore and comprises a spherically contoured portion that seats in said seat to provide for the lever to operated to describe the frustoconical zone of motion, said lever is also arranged for bodily displacement inwardly relative to said mount to unseat said spherically contoured portion from said seat, means, including detent means, defining two discrete axial positions of displacement for said mount along said axis relative to said switch body, said mount occupying one of its two discrete positions relative to said switch body when said lever and mount have both been displaced outwardly on said body along said axis to cause said switch actuating means to simultaneously actuate said plural electrical switches and when said mount occupies said one discrete axial position, a portion thereof protrudes from said switch body, said lever comprising a knob at its exterior end for abutting the protruding portion of said mount after inward displacement of the lever has slightly unseated said spherically contoured portion from said seat, and upon further inward displacement of said lever after said knob has abutted the protruding portion of said mount, the lever is effective to displace the mount axially inwardly on said switch body to the other of said two discrete axial positions.

29. A multi-function turn signal switch as set forth in claim 1 in which said electrical switches are sealed membrane switches arranged in a circular array on the interior face of a transverse end wall of said switch body and including resiliently compressible pad structure overlying said membrane switches and through which said switch actuating means is effective to actuate said membrane switches.

30. A multi-function turn signal switch as set forth in claim 29 in which said switch actuating means is disposed on said lever axially between said pad structure and the interior end of the lever.

31. A multi-function turn signal switch as set forth in claim 30 in which said switch actuating means comprises a circular disc, and said array is configured such that two immediately adjacent switches in the array can be simultaneously actuated by said disc via the depression of said pad structure by said disc.

32. A multi-function turn signal switch as set forth in claim 1 in which said switch body has a transverse wall at one axial end thereof through which said lever protrudes, and including an adapter member added onto said body at the other axial end thereof adapted for mounting the switch body to a steering column, said adapter containing means responsive to rotation of a shaft associated with such a column for operating a cancellation mechanism that is disposed within the switch body for cancelling the turn signals.

33. A multi-function turn signal switch as set forth in claim 1 further including further electrical switches disposed circumferentially on the exterior of said body, and an actuator arranged for circumferential motion on the switch body to selectively actuate said further electrical switches according to the circumferential position of said actuator.

34. A multi-function turn signal switch as set forth in claim 33 in which said further electrical switches are an array of sealed membrane switches fitted to the circumference of the switch body, and resiliently compressible pad structure overlying said array and through the compression of which said switches of the array are selectively actuated.

35. A multi-function turn signal switch as set forth in claim 34 in which said array comprises said sealed membrane switches arranged in axially adjacent, circumferentially extending rows in which the switches of one row are circumferentially offset from the switches of an immediately adjacent row, and a depressor is arranged on said actuator parallel to said longitudinal axis for selectively depressing said pad structure to in turn selectively actuate the underlying switches of the array such that at at least one circumferential position of the actuator, the depressor simultaneously actuates one switch in one row and one switch in the immediately adjacent row.

36. A multi-function turn signal switch as set forth in claim 35 including circumferentially extending detent means defining discrete circumferentially spaced positions for the actuator at at least one of which discrete positions one switch in said one row and one switch in said immediately adjacent row are simultaneously actuated, said detent means and said array being constructed and arranged such that for positioning of the actuator to displace the depressor to one side of the center of one of the detent positions, said one switch in said one row remains actuated while said one switch in said immediately adjacent row ceases to be actuated.

37. A multi-function turn signal switch as set forth in claim 36 in which said detent means and said array are constructed and arranged such that for positioning of the actuator to displace the depressor to said one side of the center of said one of said detent positions, a further switch in said immediately adjacent row is actuated.

38. A multi-function turn signal switch as set forth in claim 36 in which said detent means and said array are constructed and arranged such that for positioning of the actuator to displace the depressor to the other side of the center of said one of said detent positions, said one switch in said immediately adjacent row continues to be actuated and said one switch in said one row ceases to be actuated while a further switch in said one row is actuated.

39. A multi-function turn signal switch as set forth in claim 35 in which said pad structure is shaped as individual zones each overlying a corresponding switch, each individual pad zone comprising a bottom wall that is disposed against the underlying switch, a top wall that is parallel to the bottom wall, side walls that in a developed view are regular trapezoids in shape, and end walls that join said side walls, said top wall, and said bottom wall.

40. A multi-function switch for mounting on the steering column of an automotive vehicle to produce signals for the control of various electrical circuits of the vehicle, said switch comprising a switch body having a longitudinal axis that is for disposition generally transverse to the steering column, an array of sealed membrane switches on a wall of said switch body, resiliently yieldable pad structure overlying the array of sealed membrane switches, an actuator that is positionable on said switch body, and switch actuating means on said switch actuator which, when said actuator is positioned to various positions on said body, selectively depresses said pad structure to in turn selectively depress said sealed membrane switches of said array.

41. A multi-function switch as set forth in claim 40 including detent means associated with said actuator to define discrete positions for said actuator producing unique patterns of actuation for said sealed membrane switches, and in which said detent means and said array are constructed and arranged such that for limited displacement of said actuator to either side of the center of one of said discrete positions, said array is caused to produce further unique patterns of actuation for the switches of the array.

42. A multi-function switch as set forth in claim 41 in which said sealed membrane switches of said array are arranged in a flat circular array pattern on a transverse wall of said switch body, said transverse wall contains a mount concentric with said array, and said actuator is a lever that is supported on said mount for motion in various directions of pivoting about said longitudinal axis, said switch actuating means is disposed on said lever for actuating the switches of the array, and at least certain switches of the array are each particular to a particular discrete position of said lever defined by said detent means such that when said Lever is operated to one of its discrete positions defined by said detent means, the corresponding switch of the array is actuated by said switch actuating means depressing of said pad structure.

43. A multi-function switch as set forth in claim 42 in which said lever is arranged for longitudinal bodily displacement along said axis in a direction outward of the switch body, said mount is arranged for outward bodily displacement along said axis along with said lever, and the outward longitudinal bodily displacement of said lever and said mount relative to said body along said axis is effective to cause said switch actuating means to simultaneously actuate plural switches of the array.

44. A multi-function switch as set forth in claim 43 in which the array comprises four of said membrane switches arranged at 90 degree intervals around the array, said lever is pivotable to four positions 90 degrees apart about said longitudinal axis, two of which that are 180 degrees apart are defined by discrete positions defined by said detent means, and when the lever is respectively operated to said discrete positions, said array gives a right turn signal and a left turn signal respectively via associated respective right and left turn signal circuits, and when the lever is operated to the other two positions, said array gives a marker lamp interrupt signal and a headlamp dimmer signal respectively via associated respective marker lamp interrupt and headlamp dimmer circuits, and when said lever is displaced longitudinally, said array gives a hazard warning signal via an associated hazard warning circuit.

45. A multi-function switch as set forth in claim 40 in which said membrane switches are arranged circumferentially on the exterior of said body, and said actuator is arranged for circumferential motion on said body to selectively actuate said membrane switches according to the circumferential position of said actuator.

46. A multi-function switch as set forth in claim 45 including resiliently compressible pad structure overlying said array and through the compression of which said membrane switches of the array are selectively actuated.

47. A multi-function switch as set forth in claim 46 in which said array comprises said sealed membrane switches arranged in axially adjacent, circumferentially extending rows in which the switches of one row are circumferentially offset from the switches of an immediately adjacent row, and a depressor on said actuator is arranged parallel to said longitudinal axis for selectively depressing said pad structure to in turn selectively actuate the underlying switches of the array such that at at least one circumferential position of the actuator, the depressor simultaneously actuates one switch in one row and one switch in the immediately adjacent row.

48. A multi-function switch as set forth in claim 47 in which said detent means is constructed and arranged such that for positioning of the actuator to displace the depressor to one side of the center of one of the detent positions, said one switch in said one row remains actuated while said one switch in said immediately adjacent row ceases to be actuated.

49. A multi-function switch as set forth in claim 48 in which said detent means and said array are constructed and arranged such that for positioning of the actuator to displace the depressor to said one side of the center of said one of said detent positions, a further switch in said immediately adjacent row is actuated.

50. A multi-function switch as set forth in claim 48 in which said detent means and said array are constructed and arranged such that for positioning of the actuator to displace the depressor to the other side of the center of said one of said detent positions, said one switch in said immediately adjacent row continues to be actuated and said one switch in said one row ceases to be actuated while a further switch in said one row is actuated.

51. A multi-function switch as set forth in claim 47 in which said pad structure is shaped as individual zones each overlying a corresponding membrane switch, each individual pad zone comprising a bottom wall that is disposed against the underlying switch, a top wall that is parallel to the bottom wall, side walls that in a developed view are regular trapezoids in shape, and end walls that join said side walls, said top wall, and said bottom wall.

52. In combination, a right turn signal circuit, a left turn signal circuit, a headlamp dimmer circuit, and a marker lamp interrupt circuit of an automotive vehicle, a multi-function switch for operating said circuits, said switch comprising four sets of contacts, each of which is particular to a particular one of said circuits, said multi-function switch comprising a switch body having a longitudiknal axis, said four sets of contacts being arranged on said switch body in a circumferential array about said longitudinal axis at 90 degree intervals, and an actuating lever that is pivotally mounted on said switch body such that the pivot point is located on said axis and the lever is pivotable in two opposite directions 180 degrees apart about said axis to respectively actuate the two sets of contacts that are particular to the right turn signal circuit and left turn signal circuit respectively for giving respective right and left turn signals, said lever also being pivotable in an additional two opposite directions that are themselves 180 degrees apart about said axis but at 90 degrees to the pivotable directions for actuating the sets of contacts that are particular to the turn signal circuits, the lever being effective when pivoted in respective ones of said additional two opposite directions to respectively actuate the two sets of contacts that are particular to the headlamp dimmer circuit and the marker lamp interrupt circuit respectively for actuating the headlamp dimmer circuit and the marker lamp interrupt circuit respectively for giving headlamp dinner and marker lamp interrupt signals respectively.

53. The combination set forth in claim 52 in which the multi-function switch is constructed and arranged such that when the lever is operated to cause actuation of either the right or the left turn signal circuit, limited circumferential motion of the lever in opposite senses is also effective to respectively actuate the two sets of contacts that are particular to the headlamp dimmer circuit and the marker lamp interrupt circuit respectively and hence actuate the headlamp dimmer circuit and the marker lamp interrupt circuit respectively, simultaneously with the particular turn signal circuit that is being actuated.

54. The combination set forth in claim 52 further including a hazard warning signal circuit of the vehicle and wherein said multi-function switch further comprises said lever being longitudinally displacable bodily along said longitudinal axis to simultaneously actuate all four sets of contacts, the simultaneous actuation of all four sets of contacts being effective to actuate the hazard warning signal circuit.

55. In combination, a right turn signal turn signal circuit, a left turn signal turn signal circuit and a hazard warning signal circuit of an automotive vehicle, a multi-function switch for operating said circuits, said switch comprising a switch body on which are mounted plural sets of contacts, one of which sets of contacts is particular to the right turn signal circuit and another of which is particular to the left turn signal circuit, said switch body having a longitudinal axis, said plural sets of contacts being arranged in a circumferential array about said longitudinal axis, and an actuating lever that is pivotally mounted on said switch body such that the pivot point is located on said axis and the lever is pivotable in two opposite directions 180 degrees apart about said axis to actuate the right and left turn signal circuits respectively by the respective actuation of the particular sets of contacts that are particular to the right and left turn signal circuits respectively, and wherein said lever is also arranged to be longitudinally displacable bodily along said longitudinal axis to simultaneously actuate said plural sets of contacts, the actuation of said plural sets of contacts being effective to actuate the hazard warning signal circuit.

* * * * *